United States Patent [19]
Wallace et al.

[11] Patent Number: 5,375,324
[45] Date of Patent: Dec. 27, 1994

[54] VERTICAL AXIS WIND TURBINE WITH PULTRUDED BLADES

[75] Inventors: Vernon R. Wallace, Dublin; Michael S. McMullen, Tiburon; William R. Archibald, Petaluma, all of Calif.

[73] Assignee: FloWind Corporation, San Rafael, Calif.

[21] Appl. No.: 90,912

[22] Filed: Jul. 12, 1993

[51] Int. Cl.⁵ .............................................. B23P 15/00
[52] U.S. Cl. ............................. 29/889.21; 29/889.71; 416/196 A
[58] Field of Search ........... 29/889.21, 889.71, 889.72, 29/889; 416/230 R, 223 R, 196 A

[56] References Cited
U.S. PATENT DOCUMENTS

| | | | |
|---|---|---|---|
| 1,835,018 | 12/1931 | Darrieus | 416/119 X |
| 4,162,410 | 7/1979 | Amick | 416/196 A |
| 4,293,279 | 10/1981 | Bolie | 416/196 A |

OTHER PUBLICATIONS

"G–Mill" by Goldsworth Wind Energy Systems, Torrance, Calif.
"UTRC 15 kW Wind–System Development, Phase II–Fabrication and Testing, Feb. 1982" prepared by United Technologies Research Center, East Hartford, Conn. 06108.
"UTRC 15-kW Wind–System Development, Phase I–Design and Analysis, vol. II–Technical Report, Dec. 1981" prepared by United Technologies Research Center, East Hartford, Conn. 06108.
"Proceedings of the Vertical Axis Wind Turbine (VAWT) Design Technology Seminar for Industry" Apr. 1–3, 1980; Albuquerque, New Mexico; Sandia National Laboratories Energy Report; p. 50.
"Design Approaches For Future VAWTs" by D. J. Malcolm, Lavalin Engineers Inc., Toronto; International VAWT Technology Workshop, Pleasanton, Calif.; 11 Apr. 1991.
"Dynamically Soft Darrieus Rotors"]by D. J. Malcolm, R. Lynette & Associates Inc., Redmond, Wash.
"Pultrex P8000M Pultrusion Machine" & Pultrex P4000M Pultrusion Machine.
"Productive Systems for Profitable Pultrusion" from Pultrusion Technology, Incorporated.
"CPE Pultrusion Machines", CPE Composite Process Equipment Inc.
"Advanced Wind Energy Technology", ADECON.

*Primary Examiner*—Irene Cuda
*Attorney, Agent, or Firm*—Limbach & Limbach

[57] ABSTRACT

A pultruded composite blade for a Darrieus-type vertical axis wind turbine is disclosed, along with a method for fabricating such a blade. The blade is a composite structure with a uniform cross-section with reinforcing fibers at least some of which extend parallel to a lengthwise central axis and run continuously from end to end. The composite blade is pultruded straight and, when installed on the tower, the blade is elastically bent into a curved shape that approximates a troposkein. The composite structure includes a skin composed of multiple layers of resin-coated glass fabric that define an airfoil shape. The composite structure also includes one or more internal ribs or spars composed of multiple layers of resin-coated glass fabric.

13 Claims, 15 Drawing Sheets

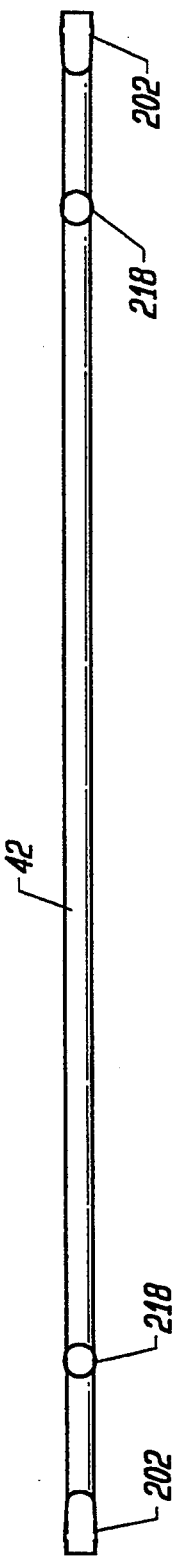
FIG. 9
FIG. 15
FIG. 10

VERTICAL AXIS WIND TURBINE WITH PULTRUDED BLADES

Background of the Invention

1. Field of the Invention

This invention relates generally to wind turbines, and relates more particularly to a Darrieus-type vertical axis wind turbine having blades fabricated by a pultrusion process.

2. Description of the Relevant Art

A Darrieus-type vertical axis wind turbine ("VAWT") typically has two curved blades joined at the ends to the top and bottom of a rotatable, vertical tower. The blades bulge outward to a maximum diameter about midway between the attachments points at the top and bottom of the tower. See U.S. Pat. No. 1,835,018 to D.J.M. Darrieus for a basic explanation of such a VAWT. The rotatable, vertical tower with the blades attached will be referred to herein as a rotor or rotor assembly. A typical VAWT supports the bottom of the rotor on a lower bearing assembly, which in turn is supported off the ground by a short base. The rotation of the rotor is coupled to and drives an electrical generator, located in the base, that produces electrical power as the rotor rotates. The top of the rotor is supported by an upper bearing assembly that is held in place by guy wires or other structures.

A key component of the VAWT are the blades, which interact with the wind to create lift forces that rotate the rotor and drive the generator. The blades typically have a symmetrical airfoil shape in cross-section with a straight chord that is oriented tangential to the swept area of the turbine. The rotor rotates faster than the wind, and the wind generates lift forces on the blades that maintain rotation of the rotor. The lift forces are periodic because each blade goes through two phases of no lift per revolution when the blade is moving either straight up-wind or straight down-wind. In addition to the wind-generated lift forces, centrifugal forces also act on the blades.

A slender structure like a VAWT blade attached by its ends to a rotating axis tends to take the shape of a troposkein when the rotor rotates. A troposkein is the shape that a linearly-distributed mass like a rope would take under centrifugal force when the rope is spun around an axis. Considering just centrifugal forces, the spinning rope takes the troposkein shape and is loaded in pure tension because it has negligible stiffness or resistance to bending. It is desirable for VAWT blades to have a troposkein shape in order to minimize stresses due to centrifugal forces, but a practical problem is how to fabricate the blades so that they assume a troposkein shape.

Prior blades for VAWTs have typically been made out of extruded aluminum shapes, but these blades are costly and do not form a true troposkein shape. One problem with extruded aluminum blades is that the billet capacities of available extrusion equipment are too small to extrude one-piece blades of sufficient length, which may exceed one hundred feet. Another problem is that forming a one-piece extruded aluminum blade into a curved troposkein shape would cause significant problems in transporting the formed blade to the site of the wind turbine. This is so because the curved blade would be perhaps thirty to forty feet wide and one hundred feet or more long and could not practically be transported by rail or road. As a consequence, an extruded aluminum blade for a VAWT is typically a three-piece assembly with a curved center section and two straight (or partially curved) end sections connecting the ends of the center section to the tower. One disadvantage of such a three-piece assembly is that it only approximates a troposkein and thus generates significant bending stresses, which increases the cost and complexity of the joints joining the center and end sections. Another disadvantage is that aluminum extrusions are costly, and post-extrusion bending adds more cost.

It has been suggested by researchers in the field of wind turbines to use pultruded fiberglass composite blades. Pultrusion is a process where reinforcing fibers coated with resin are pulled through a heated die of a desired cross-sectional shape. The pultrusion process can create extremely long parts of uniform cross-section at low cost. Pultruded blades have been used in horizontal axis wind turbines ("HAWT"), but these blades were straight and, due to the loading and structural requirements of a HAWT, such blades needed to have high stiffness. Pultruded blades have been designed and built for a vertical axis wind turbine, but not of the Darrieus-type. This prior non-Darrieus vertical axis wind turbine with pultruded blades had many straight, vertical blades with curved chords nested together and extending between two horizontal end plates. This wind turbine was similar to the rotor of a squirrel-cage fan oriented with a vertical axis. But again, the blades were straight and required high stiffness. In both these prior pultruded wind turbine blades, it was desirable to have straight blades with high stiffness, but such straight, stiff blades would not work in a Darrieus-type VAWT, which requires curved blades.

SUMMARY OF THE INVENTION

In accordance with the illustrated preferred embodiments, the present invention provides a pultruded composite blade for a Darrieus-type vertical axis wind turbine and a method for fabricating such a blade. The blade is a composite structure with a uniform cross-section and is composed of multiple layers of resin-coated fabric. The composite structure has reinforcing fibers at least some of which extend parallel to a lengthwise central axis to react tensile loads. The composite blade is pultruded straight and, when installed on the tower, the blade is elastically bent into a curved shape that approximates a troposkein when the turbine is rotating. The composite structure has a skin composed of multiple layers of resin-coated fabric that define an airfoil shape. The composite structure also preferably includes one or more internal ribs or spars composed of multiple layers of resin-coated fabric.

A significant advantage of the pultruded composite blade of the present invention is its reduced construction and installation costs over extruded aluminum blades for vertical axis wind turbines. Reduced blade cost is a very important consideration where the goal is cost effective wind-generated electricity. Blade costs are reduced because the blade is made by an economical process that results in a one-piece blade. For larger machines, blades could be fabricated in multiple sections, if desired. Pultrusion is a continuous forming process that is limited in length only by the supply of resin, fabric, and fibers that feed into the pultrusion die, and even that is not a significant limitation because more resin can be added and the fabric and fibers can be spliced to new supply rolls. Blade costs are also reduced because the blade stiffness is designed so that the blade can be bent to a curved shape upon installation, and not by a costly forming process as is required by aluminum extruded blades.

Another significant advantage to using pultrusion is that one-piece blades can be constructed in instances where it is desirable to eliminate the joints of three-piece blades and their associated structural problems, including fatigue. Eliminating the joints also further reduces cost.

A further advantage is that the straight pultruded blade of the present invention is flexible enough to be bent into a shape that approximates a troposkein, so that operational stresses on the blade are minimized. The blade is flexible enough to conform to a troposkein shape under the applied loads, but stiff enough to withstand buckling loads from high-wind conditions.

The present invention includes a method for constructing a Darrieus-type vertical axis wind turbine including fabricating a plurality of straight blades by a pultrusion process on the site of the wind turbine. Pultrusion equipment can be transported to and set up at a wind site so that the blades can be fabricated on site, thus saving significant transportation expense. Pultruding on site also allows for increased blade lengths and wind turbine heights without limitations imposed by transportation considerations. Of course, the pultrusion equipment can be set up in a factory, and the straight blades made in the factory can be transported to the site.

The present invention also encompasses a Darrieus-type vertical axis wind turbine having three or more pultruded blades. Using three or more blades, instead of the typical two blades, reduces the structural and vibratory loads on the tower and support structures over that of a comparable two blade wind turbine and thus allows for a less massive tower and support structure. The added expense of a third blade (which expense is already advantageously low) is offset by savings in the tower and support structures.

An important advantage of the present invention is that total energy recovery from a wind-site can be increased through exercising the freedom that a low-cost, light-weight blade provides in designing Darrieus-type vertical-axis wind turbines. According to the present invention, long VAWT blades are structurally and economically feasible, thus allowing increased tower heights and increased swept area without increasing swept diameters. Increased swept area is desirable because it increases wind energy capture on a per turbine basis. When total energy capture of a wind-site with multiple rows of wind turbines is considered, however, increasing swept area of conventional HAWTs or VAWTs may not increase energy capture because the increased swept diameters of the upwind turbines will generate larger wakes and thus decrease the wind energy supplied to downwind turbines. With the VAWT blades of the present invention, existing sites can be upgraded by installing taller VAWTs of the same swept diameter, which increases energy capture of all turbines without starving the downwind turbines. Such an upgrade, which is made possible through the use of the low-cost, light-weight blades of the present invention, can optimize energy extraction from a given site and further reduce power generation costs.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 9 is a plan view of a wind turbine blade according to thee present invention.

FIG. 10 is a detail view of an end, or root, of the wind turbine blade of the present invention.

FIG. 15 is a detail view of a strut attachment point of the wind turbine blade of the present invention.

DETAILED DESCRIPTION OF THE PREFERRED EMBODIMENTS

FIGS. 1 through 21 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
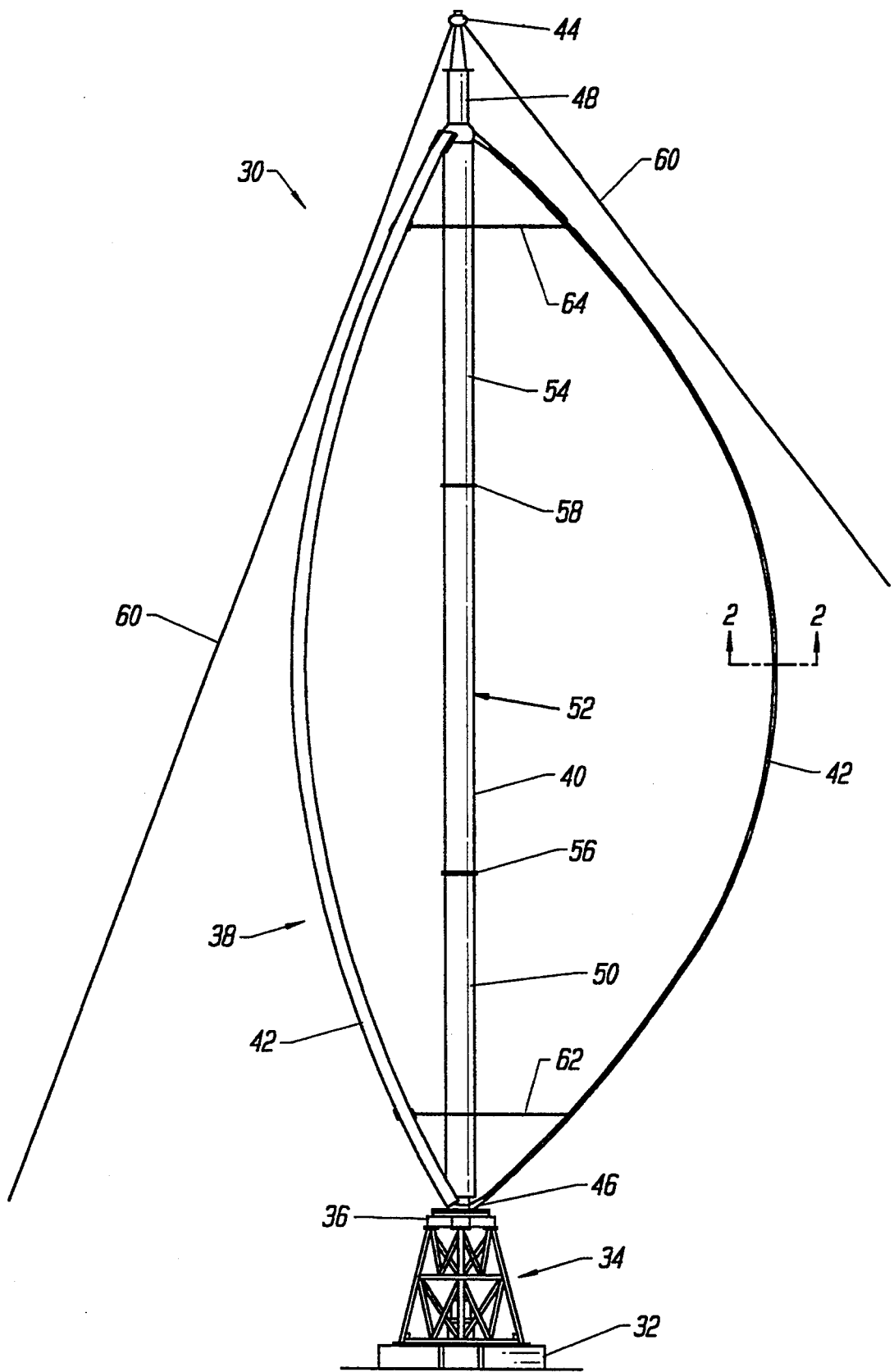
FIG. 1 is a side elevation view of a Darrieus-type vertical axis wind turbine according to the present invention.

One aspect of the present invention is a Darrieus-type vertical axis wind turbine having a plurality of pultruded, composite blades. The overall structure of such a wind turbine 30 is illustrated in FIG. 1. The wind turbine 30 rests on a suitable foundation 32, which supports a steel-framed base 34. The base 34 supports at its upper end a lower bearing assembly 36 upon which rotates a rotor assembly 38 that includes a tower 40 and multiple blades 42. The rotor assembly 38 is coupled through a gearbox (not shown) to a generator (not shown) located within the base 34. A significant advantage of a Darrieus-type vertical axis wind turbine over a horizontal axis wind turbine (HAWT) is that the generator is located at ground level, which permits ready access for service and reduces the load on the support structures. Several hydraulic brakes (not shown) are mounted to the base 34 and, when activated, clamp onto a disk mounted to the bottom of the rotor assembly to stop or slow the rotor when necessary.

The tower 40 is a rotatable, vertical structure supported at the bottom by the lower bearing assembly 36 and at the top by an upper bearing assembly 44. The bottom of the tower 40 includes a lower root assembly 46 where the bottoms of the blades are attached, and an upper root assembly 48 where the tops of the blades are attached. Spanning the distance between the lower and upper root assemblies 46 and 48 are three tubular structures 50, 52, and 54 that are bolted together at facing flanges 56 and 58. The tubular structures also 35 bolt to flanges on the lower and upper root assemblies 46 and 48. The upper bearing assembly 44 is held in position by at least three guy wires 60 that extend down to anchors (not shown) at ground level. Instead of a tubular structure, the tower 40 could be a truss or other suitable structure.

The blades 42 are attached to the rotor assembly 38 at the lower and upper root assemblies 46 and 48, which will be described in more detail below in connection with FIGS. 13 and 14. The blades 42 are preferably fabricated straight, and during installation are bent to the shape shown in FIG. 1. This shape of the blade during rotation of the rotor is approximately a troposkein shape, which is advantageous in minimizing stresses due to centrifugal forces during operation.

Two horizontal struts 62 and 64 are located at about 10% of the tower height above the lower root assembly 46 and below the upper root assembly 48, respectively. Each strut is clamped at an outer end to the blade 42 and is pinned to the tower 40 at the other end. The struts stiffen the blade against high-wind buckling that could occur when the rotor is held stationary in high wind conditions. The number and positioning of the struts is a tradeoff between blade stiffness and decreased aerodynamic performance due to drag. The struts 62 and 64 will be described in more detail below in connection with FIG. 16.

In the preferred embodiment, three blades 42 are used, which reduces the structural and vibratory loading on the tower 40 as compared to an equivalent two blade design with the same total chord length. Chord length for the blades is determined by selecting a total chord length according to a desired solidity factor times the swept area divided by blade length, and then dividing the total chord length by the number of blades used. Distributing the total blade force among three blades reduces the peak force applied by any one blade and also smooths out the force impulses. Using three blades is also advantageous in reducing the forces needed to pultrude the blade in comparison to an equivalent two blade design, since the drag force needed to pull the composite through a pultrusion die is proportional to the surface area of the pultrusion die. While three blades is preferred, four or more blades may also be cost-effective, because the additional cost of blades is offset by savings in tower and support structures. Of course, a two-blade VAWT is also within the scope of the present invention.

Figure 2:
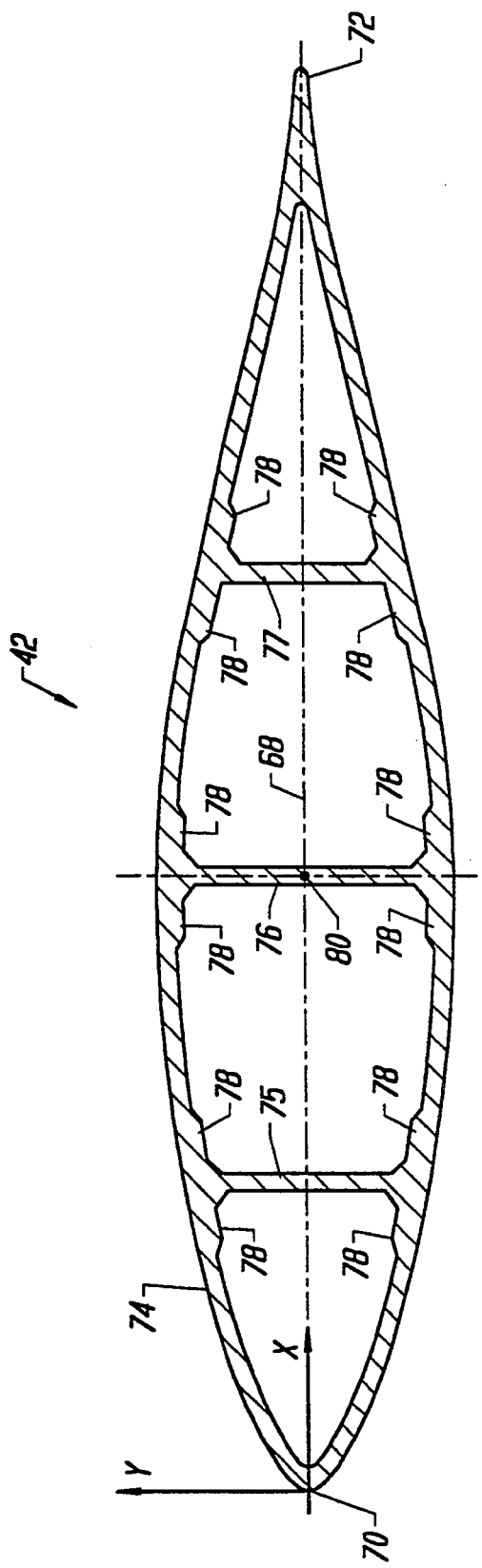
FIG. 2 is a cross section of a wind turbine blade according to the present invention, with the section taken in FIG. 1 along line 2—2.
Figure 3:
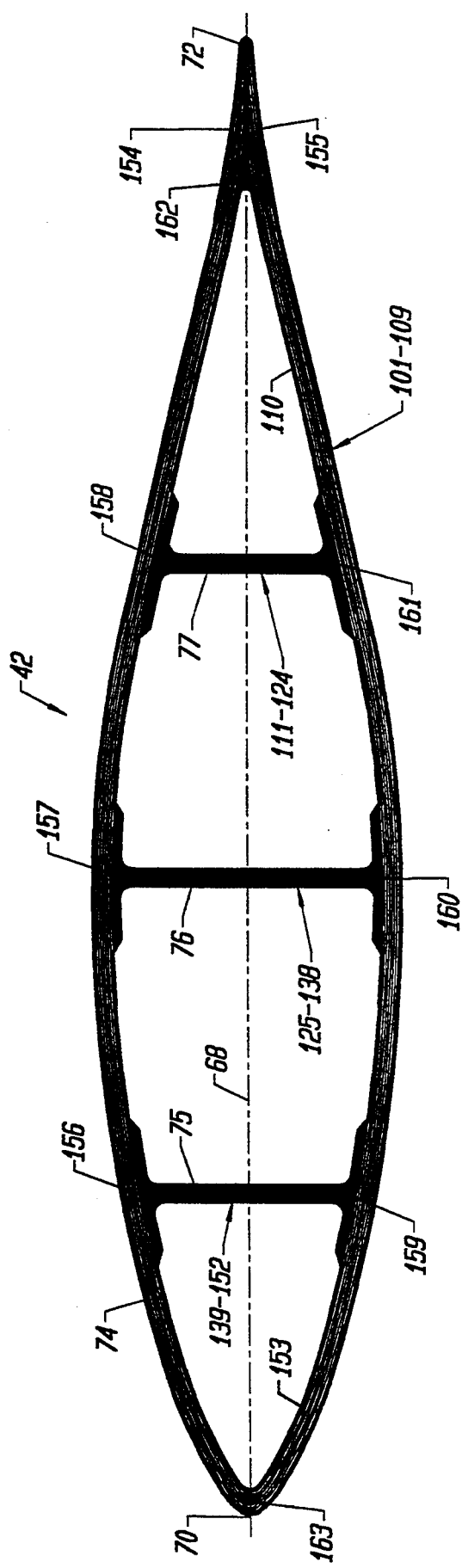
FIG. 3 is a cross section of a wind turbine blade according to the present invention, illustrating the composition of the fabric layers and fiber of the blade.

FIG. 2 is a cross-section of the blade 42 illustrating its airfoil shape. The airfoil is symmetrical about its chord 68, which is straight. The airfoil has a leading edge 70, which travels into the relative wind, and a trailing edge 72. The airfoil has a skin 74 of substantially uniform thickness, and three ribs 75, 76, and 77 that extend laterally across the chord. The thickness of the skin 74 is increased at the points where the ribs 75–77 are attached, forming flanges 78. A lengthwise central axis 80 of the blade 42 extends lengthwise through the blade, perpendicular to the section, from the center of the chord midway between the leading and trailing edges of the blade.

The profile of the airfoil is set forth in Table I, where "X" is measured in inches along the chord from the leading edge and "Y" is measured in inches perpendicular to the chord. This blade was designed for a 300 KW VAWT having three blades and a 23 meter swept diameter and a 39 meter rotor assembly height (height-to-diameter ratio H/D =1.7). Maximum thickness of the airfoil is 21% of the chord and is located at 41.5% of the chord aft of the leading edge. This airfoil was developed by Sandia

TABLE I

| \multicolumn{6}{c}{BLADE COORDINATES} | | | | | |
| X | ±Y | X | ±Y | X | ±Y |
| --- | --- | --- | --- | --- | --- |
| .000 | .000 | 1.395 | 1.066 | 9.900 | 2.797 |
| .020 | .083 | 1.440 | 1.087 | 10.320 | 2.817 |
| .045 | .135 | 1.463 | 1.097 | 10.800 | 2.832 |
| .083 | .192 | 1.530 | 1.127 | 11.215 | 2.837 |
| .090 | .202 | 1.585 | 1.150 | 11.700 | 2.835 |
| .122 | .240 | 1.620 | 1.166 | 12.147 | 2.824 |
| .135 | .255 | 1.660 | 1.183 | 12.600 | 2.804 |
| .164 | .286 | 1.710 | 1.203 | 13.045 | 2.773 |
| .180 | .304 | 1.739 | 1.215 | 13.500 | 2.732 |
| .205 | .328 | 1.800 | 1.240 | 13.981 | 2.678 |
| .225 | .348 | 1.889 | 1.276 | 14.400 | 2.623 |
| .247 | .368 | 2.025 | 1.328 | 14.892 | 2.548 |
| .270 | .389 | 2.135 | 1.370 | 15.300 | 2.479 |
| .303 | .418 | 2.250 | 1.412 | 15.820 | 2.383 |
| .315 | .427 | 2.354 | 1.450 | 16.200 | 2.308 |
| .360 | .463 | 2.475 | 1.492 | 16.744 | 2.194 |
| .405 | .499 | 2.559 | 1.521 | 17.100 | 2.117 |
| .427 | .516 | 2.700 | 1.568 | 17.651 | 1.993 |
| .450 | .532 | 2.892 | 1.630 | 18.000 | 1.913 |
| .495 | .564 | 3.150 | 1.708 | 18.574 | 1.780 |
| .540 | .595 | 3.374 | 1.774 | 18.900 | 1.703 |
| .554 | .605 | 3.600 | 1.838 | 19.482 | 1.565 |
| .585 | .626 | 3.836 | 1.901 | 19.800 | 1.489 |
| .616 | .646 | 4.050 | 1.956 | 20.250 | 1.380 |
| .630 | .655 | 4.274 | 2.012 | 20.700 | 1.272 |
| .675 | .684 | 4.500 | 2.065 | 21.105 | 1.174 |
| .720 | .712 | 4.738 | 2.120 | 21.600 | 1.055 |

TABLE I-continued

| BLADE COORDINATES | | | | | |
|---|---|---|---|---|---|
| X | ±Y | X | ±Y | X | ±Y |
| .742 | .725 | 4.950 | 2.166 | 21.882 | .989 |
| .765 | .739 | 5.174 | 2.213 | 22.500 | .845 |
| .810 | .765 | 5.400 | 2.258 | 22.899 | .755 |
| .855 | .792 | 5.632 | 2.301 | 23.400 | .646 |
| .862 | .796 | 5.850 | 2.340 | 23.745 | .574 |
| .900 | .817 | 6.100 | 2.383 | 24.300 | .465 |
| .945 | .842 | 6.300 | 2.416 | 24.714 | .389 |
| .990 | .866 | 6.489 | 2.445 | 25.200 | .306 |
| 1.035 | .890 | 6.750 | 2.484 | 25.719 | .226 |
| 1.080 | .914 | 6.920 | 2.509 | 26.100 | .178 |
| 1.118 | .933 | 7.200 | 2.547 | 26.383 | .148 |
| 1.170 | .959 | 7.564 | 2.593 | 26.550 | .132 |
| 1.240 | .993 | 8.100 | 2.653 | 26.572 | .131 |
| 1.260 | 1.003 | 8.512 | 2.694 | 26.902 | .106 |
| 1.305 | 1.024 | 9.000 | 2.736 | 27.000 | .000 |
| 1.350 | 1.045 | 9.432 | 2.768 | | |

FIGS. 3–6 illustrate the composite layers of the preferred construction of blade 42. The skin 74 of the blade is formed from nine layers 101–109 (numbered from the outside to the inside) of glass fabric. The outermost skin layer 101 is composed of trevira (vail cloth), which is a spun, bonded polyester fabric. The trevira outer layer protects the inner layers from abrasive wear, but does not contribute significantly to the strength of the blade 42. The eight inner layers 102–109 of the skin are each composed of three-ply, nonwoven, stitched fabric having an orientation of 0°/+45°/0° or 0°/−45°/0°. As shown in the exploded perspective view of FIG. 7, 0°/+45°/0° fabric has two plys 82 of fibers oriented at 0° with respect to the lengthwise central axis 80 and one ply 84 of fibers oriented at +45° to the lengthwise central axis. The three plys 82 and 84 are stitched together with cross-wise stitches (not shown). Alternatively, the fibers and plys could be bonded together with an adhesive, or a combination of stitching and adhesive bonding. A layer having an orientation of 0°/−45°/0° is like the 0°/+45°/0° layer, but with the fibers of the middle layer oriented at −45° with respect to the lengthwise central axis 80.

The eight inner layers 102–109 of the skin have four layers of 0°/+45°/0° fabric and four layers of 0°/−45°/0° fabric. This orients two-thirds of the fibers parallel to the lengthwise central axis 80 for tensile strength. The remaining one-third of the fibers are oriented at ±45° (one-sixth at ±45° and one-sixth at −45°) with respect to the lengthwise central axis 80 to provides torsional strength.

Each of the nine layers 101–109 of the skin extend from the trailing edge 72 along one skin surface to the leading edge 70, and back along the other skin surface to the trailing edge. These nine layers are labeled primary skin layers in Table II, with layer 101 outermost and layer 109 innermost. The placement of secondary skin layers 110, 153, 154, and 155 will be explained below. Width is given in inches.

TABLE II

| SKIN PLY SCHEDULE | | |
|---|---|---|
| LAYER | FIBER ORIENTATION | WIDTH |
| Primary Skin Layers | | |
| 101 | TREVIRA | 53.64 |
| 102 | 0°/+45°/0° | 51.46 |
| 103 | 0°/−45°/0° | 54.66 |
| 104 | 0°/−45°/0° | 53.68 |
| 105 | 0°/+45°/0° | 52.88 |
| 106 | 0°/+45°/0° | 52.04 |
| 107 | 0°/−45°/0° | 51.38 |
| 108 | 0°/−45°/0° | 50.76 |
| 109 | 0°/+45°/0° | 54.60 |
| Secondary Skin Layers | | |
| 110 | TREVIRA | 11.40 |
| 153 | TREVIRA | 8.60 |
| 154 | 0°/+45°/0° | 4.30 |
| 155 | TREVIRA | 2.12 |

Figure 4:
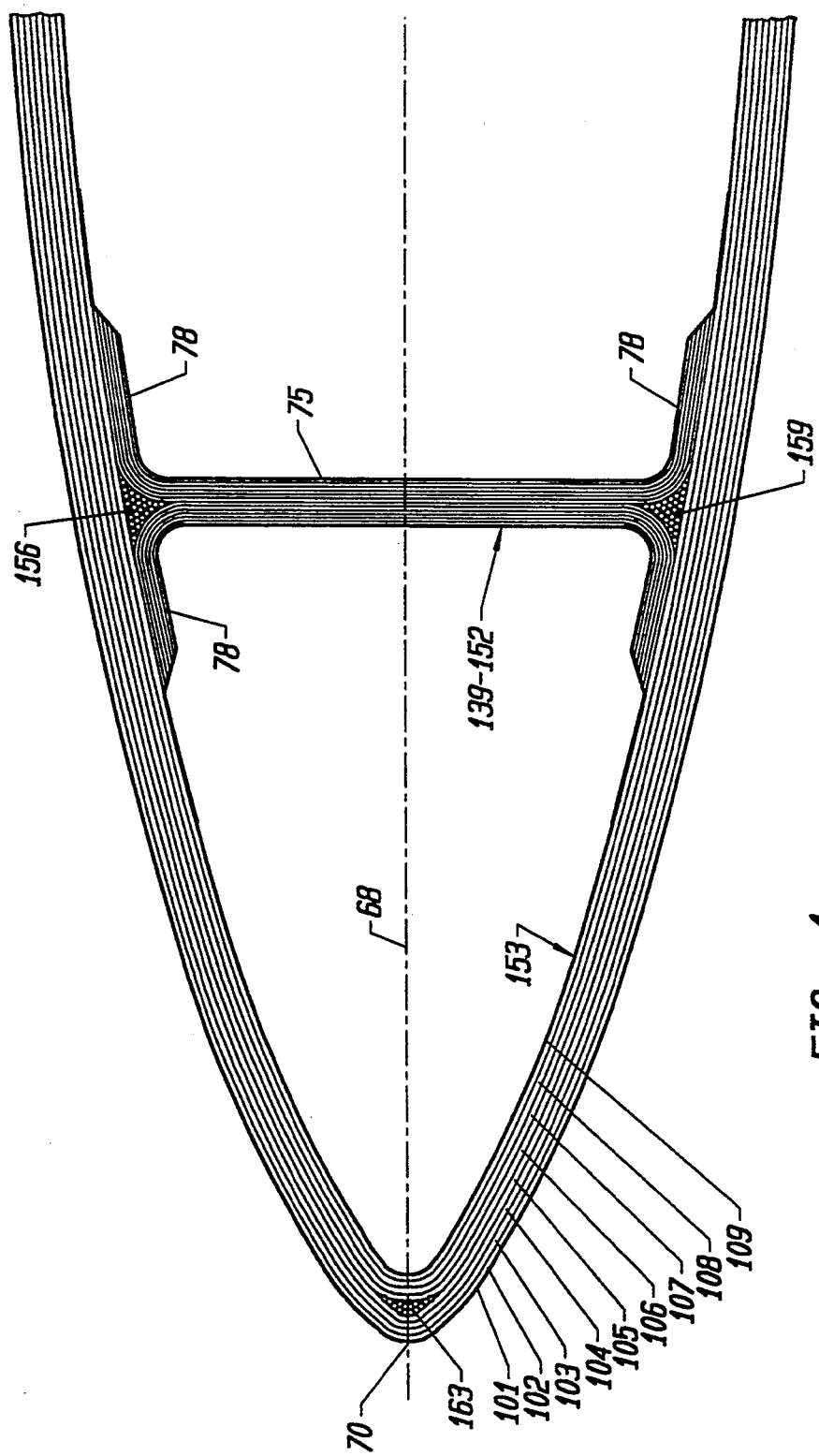
FIG. 4 is an enlarged cross section of FIG. 3 at the leading edge of the blade.

Secondary skin layers 110, 153, 154, and 155 form localized portions of the skin, and do not extend from the trailing edge to the leading edge and back to the trailing edge as do the primary skin layers 101–109. As best shown in FIG. 4, layer 153 is the innermost layer of the skin forward of the forward rib 75. Both ends of layer 153 are overlapped by layer 139 of the forward rib. Filler fibers 163 (also known as "tows"), oriented at 0° with respect to the lengthwise central axis 80, are placed at the leading edge 70 between layers 105 and 06.

Figure 6:
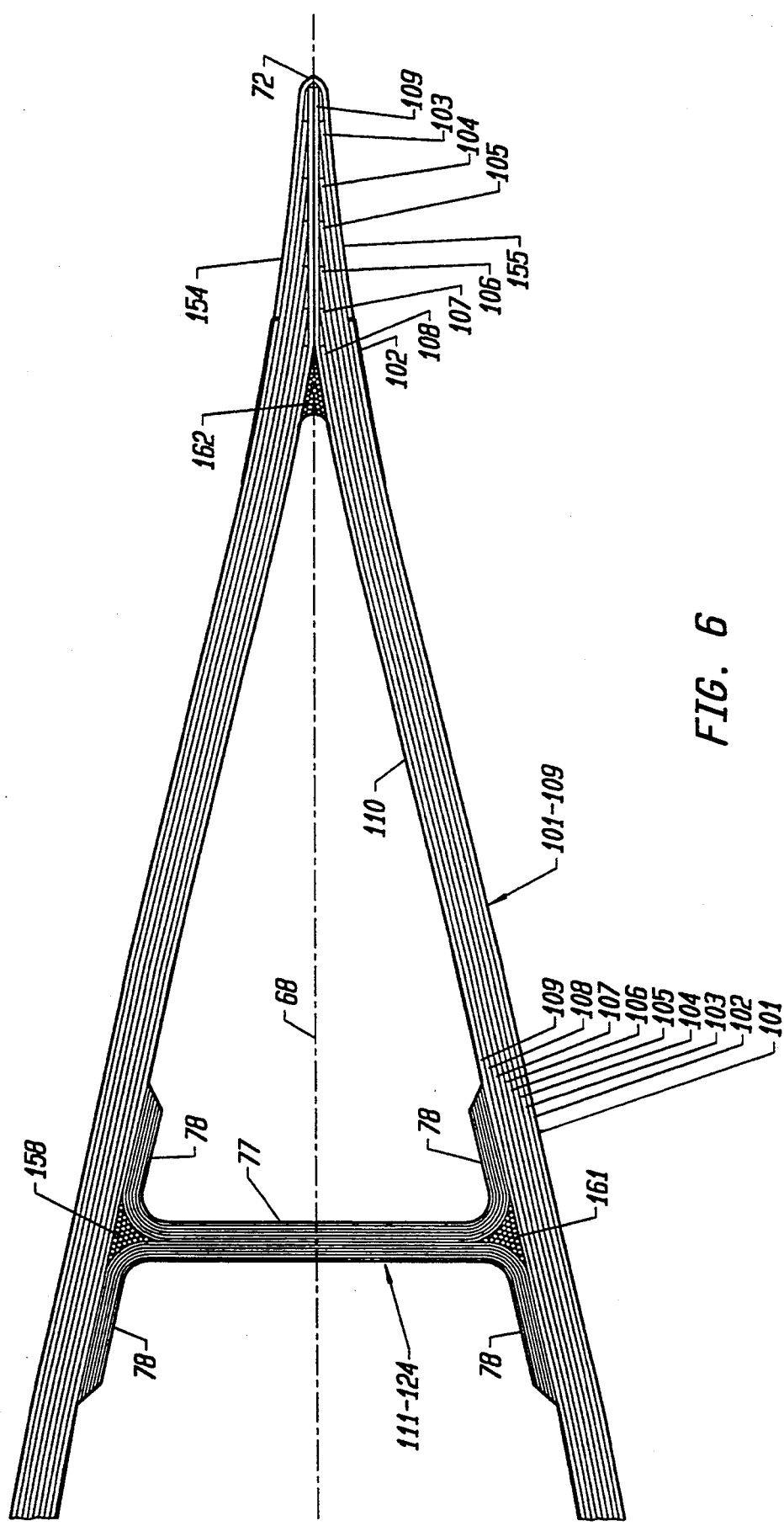
FIG. 6 is an enlarged cross section of FIG. 3 at the trailing edge of the blade.
Figure 7:
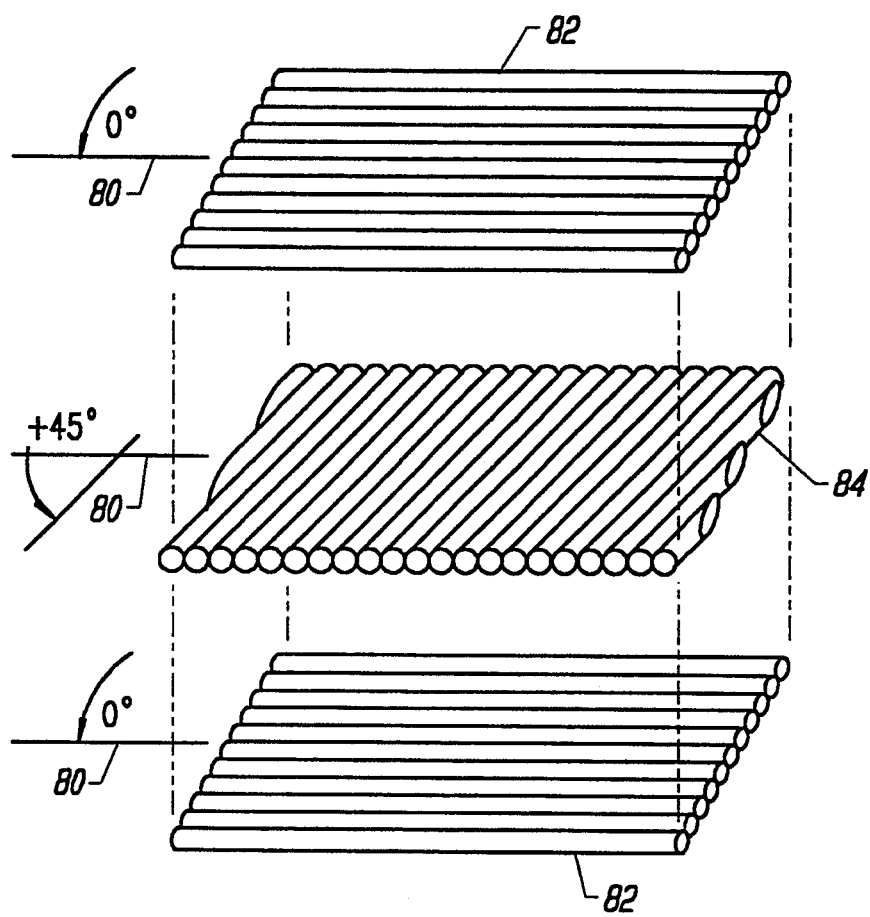
FIG. 7 is an exploded perspective view of a portion of a 0°/+45°/0° ply of nonwoven, stitched fabric used in skin layers of the wind turbine blade of the present invention.
Figure 8:
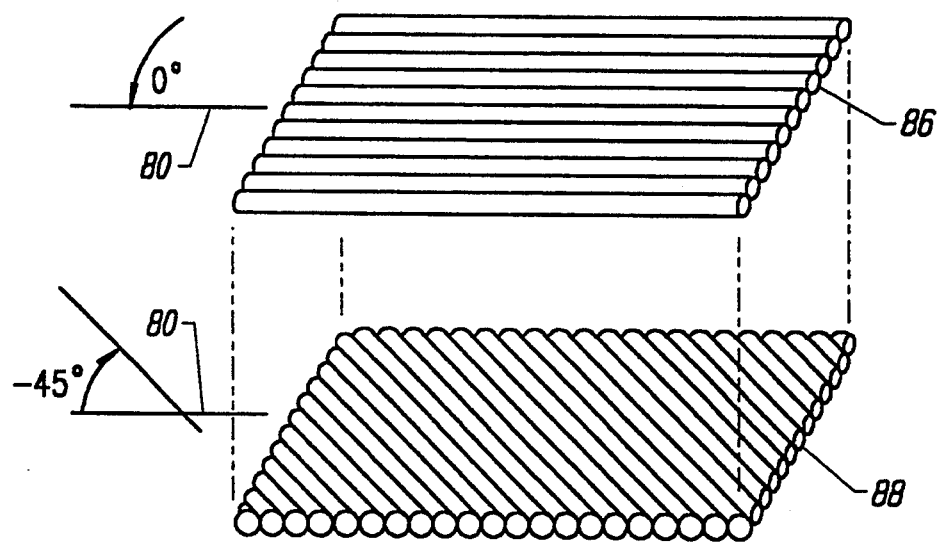
FIG. 8 is an exploded perspective view of a portion of a 0°/−45° ply of nonwoven, stitched fabric used in rib layers of the wind turbine blade of present invention.

As best shown in FIG. 6, layer 110 is the innermost layer of the skin aft of the aft rib 77. Both ends of layer 110 are overlapped by layer 124 of the aft rib. Filler fibers 162 are placed at the trailing edge 72 between layers 110 and 109. To accommodate the taper of the trailing edge 72, the aft ends of layers 102–108 are staggered as shown. Layer 109 extends aft to the trailing edge. Structural layer 154 is wrapped around the trailing edge, and is covered by trevira layer 155. The forward edges of trevira layer 155 overlap the aft edges of trevira layer 101.

FIG. 6 also illustrates the composite layers 111–124 (numbered left to right) in the aft rib 77. Layers 111–117 form the left half of the aft rib, while layers 118–124 form the right half of the aft rib. The outermost layers 111 and 124 are trevira and extend past the flanges 78 and overlap with trevira layers 138 from the middle rib and 110 to the rear, respectively. The remaining layers 112–123 are bent at the skin to form the flanges 78. The spaces between the flanges and the rib layers are filed with filler fibers 158 and 161.

Figure 5:
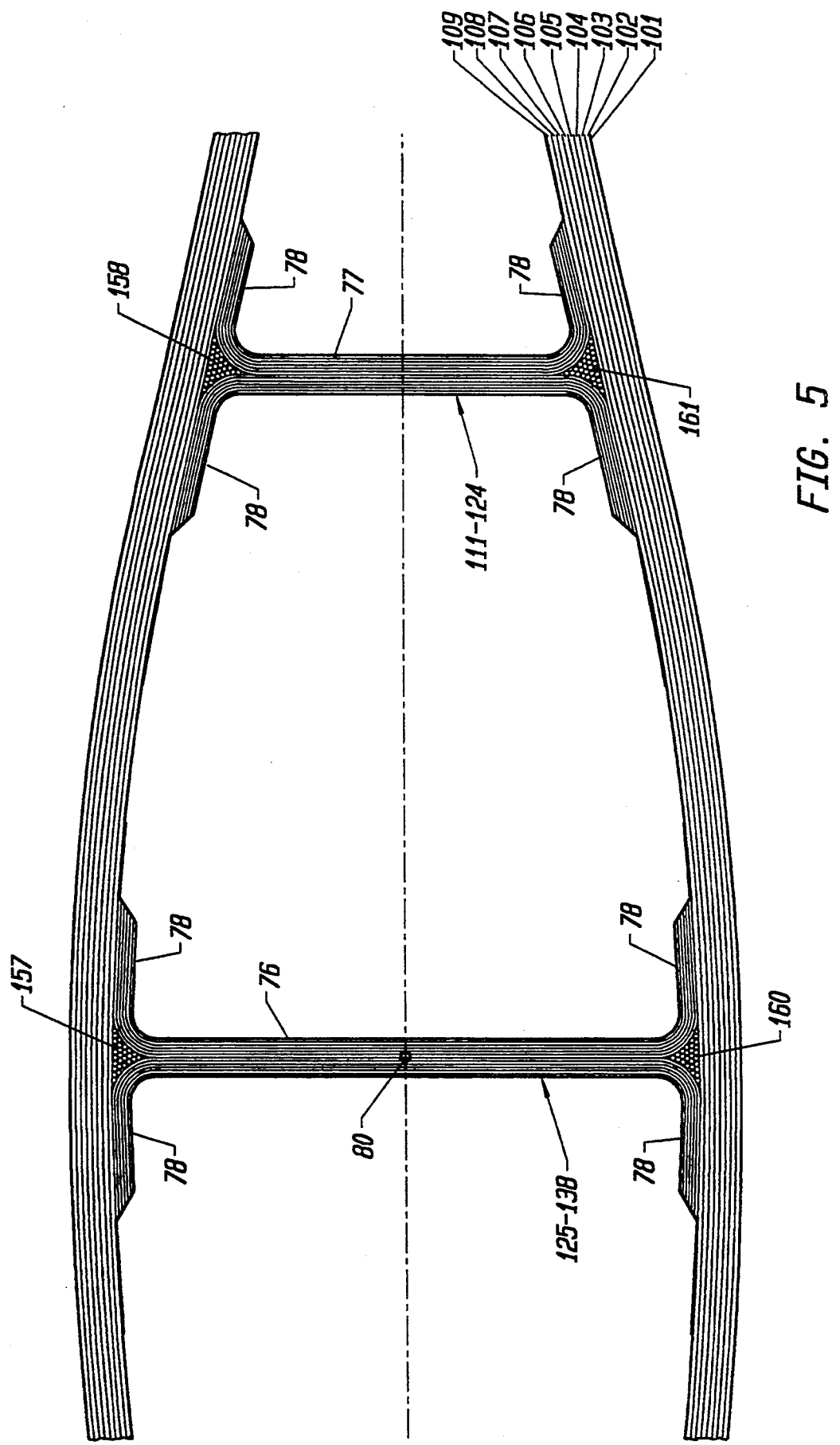
FIG. 5 is an enlarged cross section of FIG. 3 at the center of the blade

FIG. 5 illustrates the composite layers 125–138 (numbered left to right) in the middle rib 76. Layers 125–131 form the left half of the middle rib, while layers 132–138 form the right half of the middle rib. The outermost layers 125 and 138 are trevira and extend past the flanges 78 and overlap with trevira layers 152 from the forward rib and 111 from the rear rib, respectively. The remaining layers 126–137 are bent at the skin to form the flanges 78. The spaces between the flanges and the rib layers are filed with filler fibers 157 and 160.

FIG. 4 illustrates the composite layers 139–152 (numbered left to right) in the forward rib 75. Layers 139–145 form the left half of the forward rib, while layers 146–152 form the right half of the forward rib. The outermost layers 139 and 152 are trevira and extend past the flanges 78 and overlap with trevira layers 125 35 from the middle rib and 153 from the forward area, respectively. The remaining layers 140–151 are bent at the skin to form the flanges 78. The spaces between the flanges and the rib layers are filed with filler fibers 156 and 159. The structural layers 112–123, 126–137, and 140–151 of the ribs are composed of two-ply, nonwoven, stitched fabric having an orientation of 0°/+45° or 0°/−45°. As shown in an exploded perspective view in FIG. 8, 0°/−45° fabric has one ply 86 of fibers oriented at 0° with respect to the lengthwise central axis 80 and one ply 88 of fibers oriented at −45° to the lengthwise central axis. The two plys 86 and 88 are stitched together with cross-wise stitches (not shown). Alternatively, the fibers and plys could be bonded together with an adhesive, or a combination of stitching and adhesive bonding. A layer having an orientation of 0°/+45° is like the 0°/−45° layer, but with the fibers of the middle layer oriented at +45° with respect to the lengthwise central axis 80.

Each rib is constructed of six layers of 0°/+45° fabric and six layers of 0°/−45° fabric. This orients one-half of the fibers parallel to the lengthwise central axis 80 for tensile strength. The remaining one-half of the fibers are oriented at ±45° (one-fourth at +45° and one-fourth at −45°) with respect to the lengthwise central axis 80, which provides torsional strength. The fabric specifications for the ribs and filler fibers are given in the Tables III and IV.

TABLE III

| LAYER | FIBER ORIENTATION | WIDTH |
|---|---|---|
| RIB PLY SCHEDULE | | |
| Aft Rib Layers | | |
| 111 | TREVIRA | 9.66 |
| 112 | 0°/−45° | 5.30 |
| 113 | +45°/0° | 5.54 |
| 114 | +45°/0° | 5.78 |
| 115 | −45°/0° | 6.00 |
| 116 | −45°/0° | 6.24 |
| 117 | +45°/0° | 6.48 |
| 118 | 0°/+45° | 5.72 |
| 119 | 0°/−45° | 5.58 |
| 120 | 0°/−45° | 5.42 |
| 121 | 0°/+45° | 5.26 |
| 122 | 0°/+45° | 5.10 |
| 123 | −45°/0° | 4.96 |
| 124 | TREVIRA | 7.30 |
| Middle Rib Layers | | |
| 125 | TREVIRA | 10.96 |
| 126 | 0°/−45° | 6.70 |
| 127 | +45°/0° | 6.88 |
| 128 | +45°/0° | 7.06 |
| 129 | −45°/0° | 7.24 |
| 130 | −45°/0° | 7.42 |
| 131 | +45°/0° | 7.60 |
| 132 | 0°/+45° | 7.52 |
| 133 | 01/−45° | 7.36 |
| 134 | 0°/−45° | 7.18 |
| 135 | 0°/+45° | 7.02 |
| 136 | 0°/+45° | 6.86 |
| 137 | −45°/0° | 6.68 |
| 138 | TREVIRA | 10.96 |
| Forward Rib Layers | | |
| 139 | TREVIRA | 8.08 |
| 140 | 0°/−45° | 5.58 |
| 141 | +45°/0° | 5.78 |
| 142 | +45°/0° | 5.96 |
| 143 | −45°/0° | 6.16 |
| 144 | −45°/0° | 6.34 |
| 145 | +45°/0° | 6.54 |
| 146 | 0°/+45° | 6.88 |
| 147 | 0°/−45° | 6.68 |
| 148 | 0°/−45° | 6.46 |
| 149 | 0°/+45° | 6.26 |
| 150 | 0°/+45° | 6.06 |
| 151 | −45°/0° | 5.84 |
| 152 | TREVIRA | 5.76 |

TABLE IV

| FILLER | ENDS/INSQ | AREA | # FIBERS REQ. |
|---|---|---|---|
| FILLER FIBER SCHEDULE | | | |
| 156 | 190 | .0862 | 16 |
| 157 | 190 | .0804 | 15 |
| 158 | 190 | .0880 | 17 |

TABLE IV-continued

| FILLER | ENDS/INSQ | AREA | # FIBERS REQ. |
|---|---|---|---|
| FILLER FIBER SCHEDULE | | | |
| 159 | 190 | .0862 | 16 |
| 160 | 190 | .0804 | 15 |
| 161 | 190 | .0880 | 17 |
| 162 | 190 | .0773 | 15 |
| 163 | 190 | .0429 | 8 |

The modulus of elasticity along the lengthwise central axis 80 of the composite that forms the skin is about 4,200,000 pounds per square inch, while the modulus of the composite that forms the ribs is about 3,600,000 pounds per square inch. The nominal thickness of the skin and ribs is about 0.355 inches. Preferably, the composite that forms the skin and rib layers is composed of E-glass (Owens-Corning type 30) and Vinylester resin formulation XB3-57. The stitched fabric that forms the 0°, +45° and −45° plys are preferably Knytex A130A or the equivalent constructed of E-glass (Owens-Corning type 30) using polyester thread.

The blade composite is designed to have about 71% fiber by weight and about 50% fiber by volume. Preferably, the blade has at least 60% fibers by weight. While the desired modulus along the lengthwise central axis 80 of the skin layer is about 4,000,000 psi, it could be greater or less than 4,000,000 psi and still achieve the benefit of the present invention. If the modulus of the skin layers is greater than about 5,000,000 psi, however, the blade may be too stiff to be readily bent into place and would have an unacceptably high stress due to such bending. If the modulus of the skin layers is less than about 3,000,000 psi, then the blade would be too flexible to survive high wind loads, which can cause buckling of the blade when the wind turbine is stopped due to excessive winds. Thus, the desired modulus of the composite materials along the lengthwise central axis 80 is preferably within the range of 3,000,000 psi to 5,000,000 psi. The modulus of the composite material can be varied by using different fibers (a stiffer fiber like carbon or Kevlar would increase the modulus), different ratios of fibers to resin (an increased fiber/resin ratio would increase the modulus), or different fiber orientations (orienting fewer fibers at 0° with respect to the central axis 80 would decrease the modulus).

One important aspect of the nonwoven fabric used in the skin and rib layers of the blade composite is that the fibers are straight and a significant number of fibers are oriented at 0° with respect to the lengthwise central axis of the blade where they can resist bending loads. Such straight fibers can resist tensile stresses on the blade better than woven fabrics. Woven fabrics, due to their construction, do not have straight fibers; longitudinal warp fibers and lateral weft fibers are interlaced, causing both types of fibers to deviate from a straight orientation. The application of a tensile stress to a composite structure reinforced with a woven fabric causes the fibers to first straighten out before the fibers can take any significant tensile load, but the strain associated with the straightening may be excessive and may fracture the composite resin.

Turning now to FIGS. 9-16, the attachment of the blade 42 to the tower 40 will be described. Each blade 42 is attached to the bottom of the tower 40 by the lower root assembly 46 and attached to the top of the tower by the upper root assembly 48. The blades are also attached to the tower by struts 62 and 64.

Figure 11:
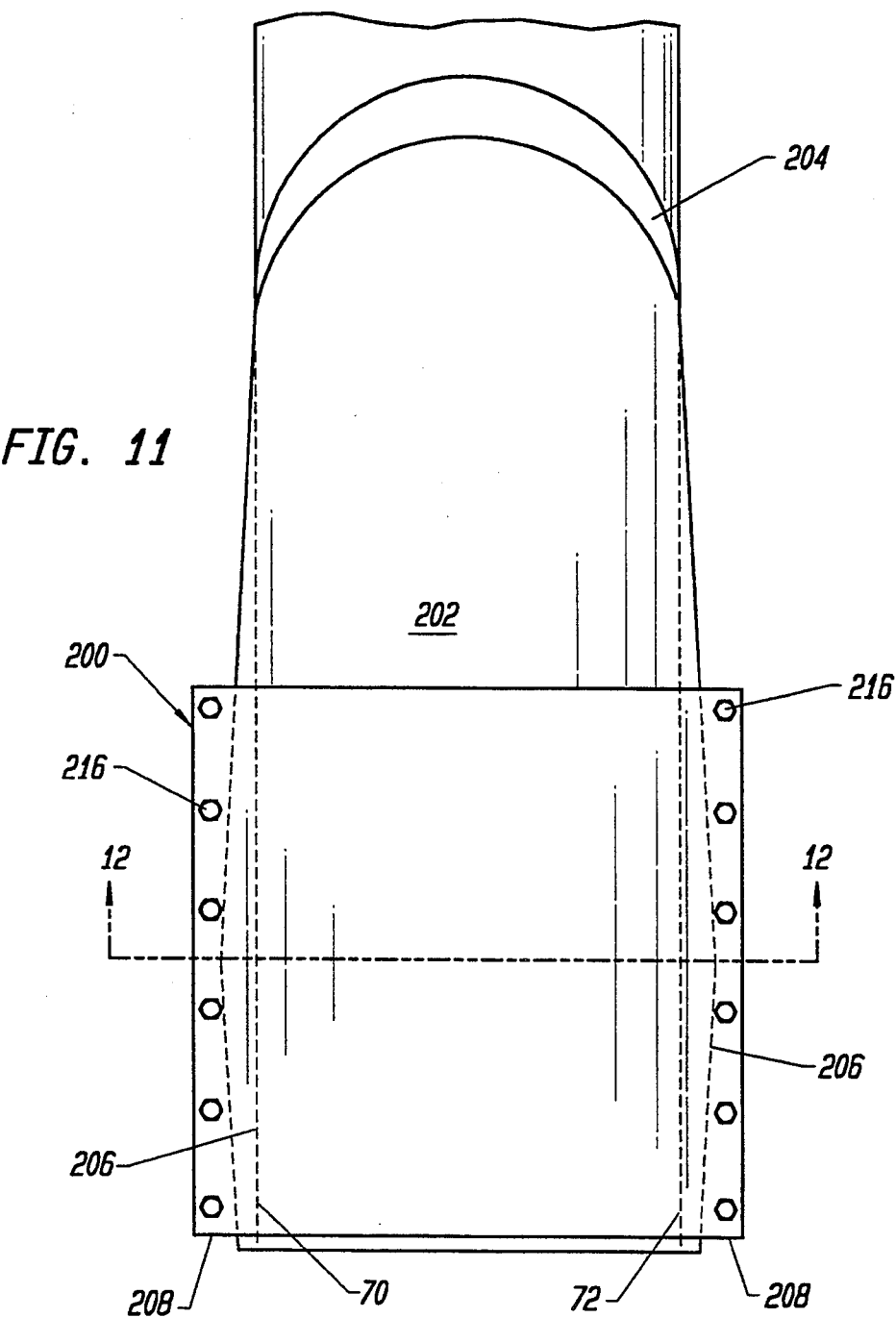
FIG. 11 is a detail view of an attachment clamp at the root attachment of the wind turbine blade.
Figure 12:
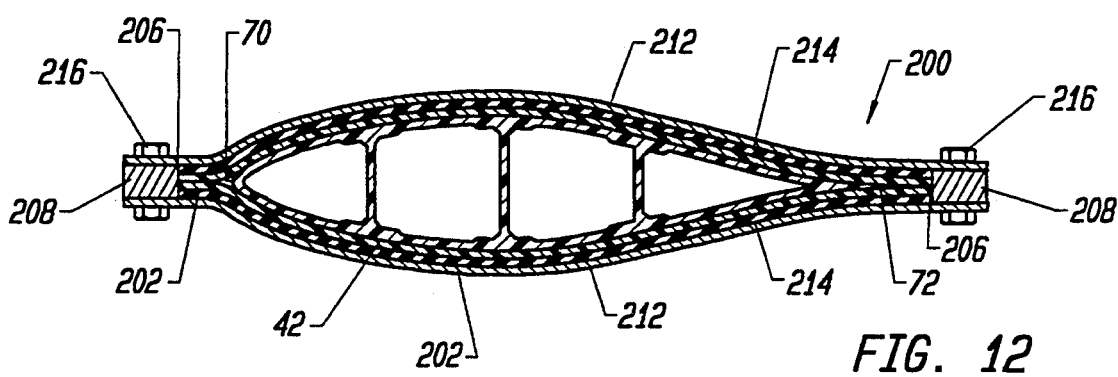
FIG. 12 is a sectional view of the attachment clamp of FIG. 11, taken along section line 12—12.

Each attachment to the blade is accomplished by a clam-shell clamp 200, as best shown in FIGS. 11 and 12. The blade 42 is built-up with a layer 202 of glass-reinforced resin that is bonded to the outside surface of the blade. Outside the area of the clamp 200, the built-up layer 202 is tapered down to the surface of the blade, as shown at area 204 in FIG. 11. The built-up layer 202 extends beyond the leading edge 70 and trailing edge 72 of the blade and is shaped to a double taper 206. The double taper 206 has a maximum thickness at the center of the clamp 200, and then tapers inward from that point in both directions. Outward from each double tapered edge of the layer 202 is a metal spacer 208 that has a corresponding double tapered surface. The blade with its built-up layer 202 and the metal spacers 208 are held within two metal clamp plates 212 of the clamp 200. A cushion layer of polyurethane 214 is positioned between the built-up layer 202 and the clamp plates 212. The clamp plates 212 are shaped to the contours of the blade, allowing for the increased thickness due to the built-up layer 202 and cushion layer 214. The sides of the clamp plates 212 are bolted together, with the metal spacers 208 captured therebetween, with several bolts 216. The double tapers on the sides of the blade and the metal spacers prevent the blade from shifting within the clamp 200.

As shown in FIGS. 9 and 10, the built-up area 202 is formed at both ends of the blade 42. Two similar built-up areas 218 are formed on the blade at the attachment points for the struts 62 and 64, as shown in FIGS. 9 and 15.

Figure 13:
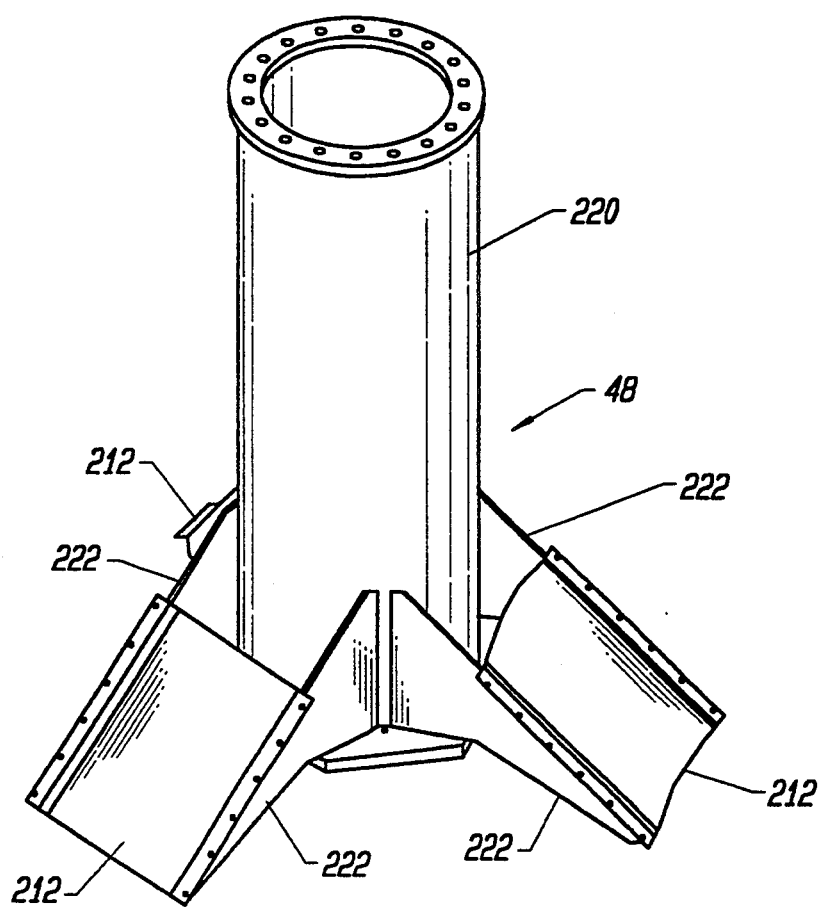
FIG. 13 is a perspective view of an upper root attachment that attaches the blade to the upper end of a tower.

FIG. 13 shows the upper root assembly 48, which provides the means for attaching the tops of three blades to the tower 40. The upper root assembly 48 includes a tube 220 that is bolted at the bottom to the top of the uppermost tube 54 of the tower 40 and is bolted at the top to the upper bearing assembly 44. The upper root assembly 48 has three blade attachments, each of which includes a clamp plate 212 that is secured to the tube 220 by support plates 222. Preferably, the support plates 222 are welded to the tube 220 and to the clamp plates 212. The blades 42 are clamped to the upper root assembly 48 by the clamp 200 shown in FIGS. 1 and 12.

Figure 14:
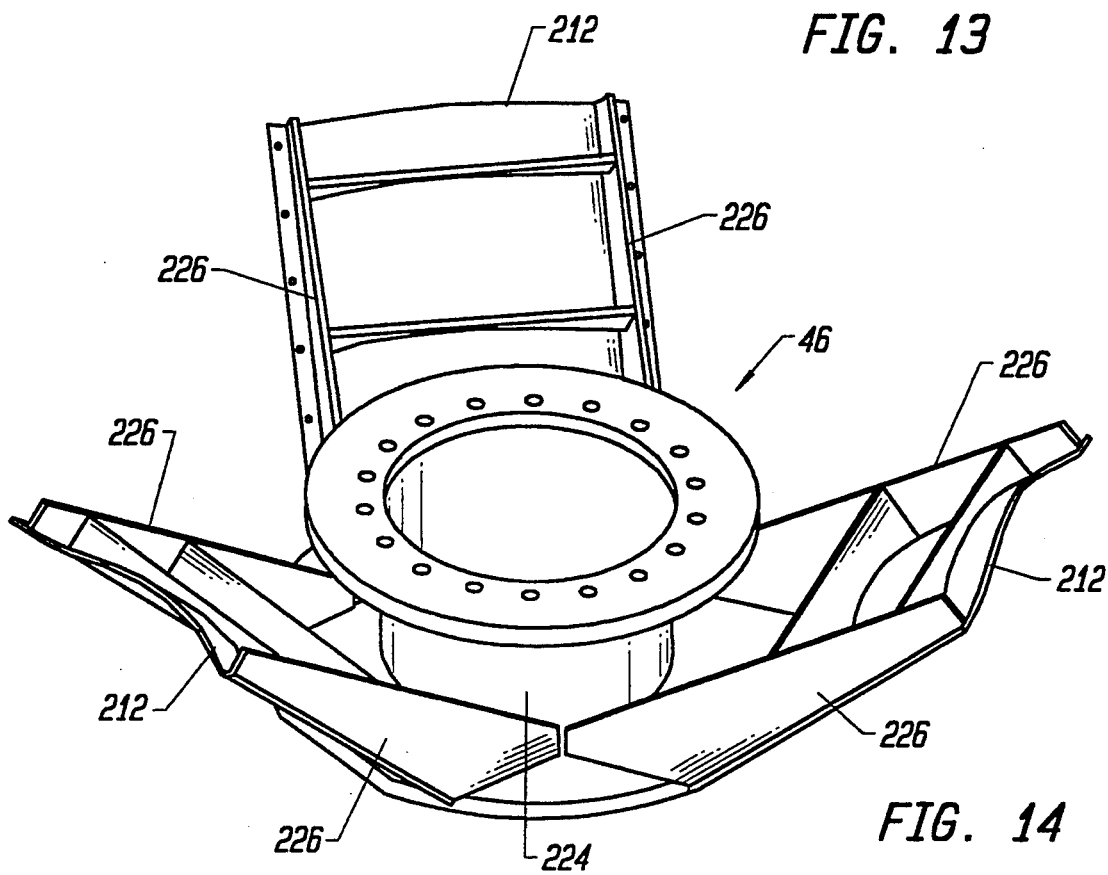
FIG. 14 is a perspective View of a lower root attachment that attaches the blade to the bottom end of the tower.

FIG. 14 shows the lower root assembly 46, which provides the means for attaching the bottoms of three blades to the tower 40. The lower root assembly 46 includes a tube 224 that is bolted at the bottom to the lower bearing assembly 36 and is bolted at the top to the lowermost tube 50 of the tower 40. The lower root assembly 46 has three blade attachments, each of which includes a clamp plate 212 that is secured to the tube 24 by support plates 226. Preferably, the support plates 226 are welded to the tube 224 and to the clamp plates 212. The blades 42 are clamped to the lower root assembly 46 by the clamp 200 shown in FIGS. 11 and 12.

Figure 16:
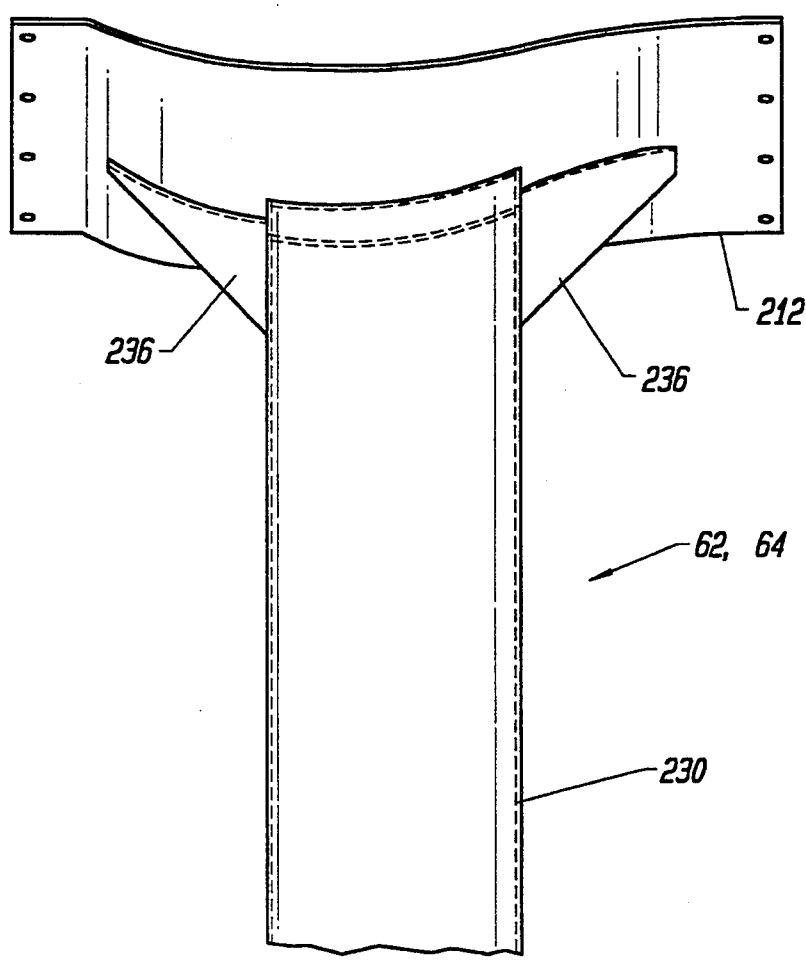
FIG. 16 is a plan view of a strut that connects the wind turbine blade to the tower of the present invention.

FIG. 16 illustrates the structure of the struts 62 and 64. The strut includes a rectangular metal tube 30 that extends radially (with respect to the tower axis) between a tapered inner end 232 with a hole 234 therethrough to a clamp plate 212. The clamp plate 212 is welded to support plates 236 and to the tube 230. The tapered inner end 232 is pinned to a clevis or other coupling that is attached to the tower. The clamp plate 12 clamps onto the blade at build-up area 218 (FIGS. 9 and 15) with a clamp assembly that is smaller but similar to that shown in FIGS. 11 and 12.

Both the root attachments and the struts improve the resistance of the blade to buckling caused by high wind loads under static conditions. A buckling failure could occur when the wind turbine is static (not rotating) due to high winds. In the worst case, a blade positioned upwind from the tower would present a full profile to the wind. If center of the blade bends inward under the wind load, then buckling can occur. The clamping of the blades into the root attachments provides some resistance to bending by resisting rotation of the blade end about its attachment. The struts provide further resistance to inward bending of the blades. If blade buckling becomes a limiting factor in the design of a VAWT according to the present invention, then the struts can be moved closer to the center of the tower than the placement illustrated in the preferred embodiment, which places the struts at 10% of the tower height. Also, increasing the number of struts would also reduce blade buckling, but could negatively affect wind turbine performance due to undesirable drag and could affect durability by creating stress risers at the points of attachment.

The blade 42 is made by a pultrusion process using equipment illustrated in FIGS. 17-21. Generally speaking, pultrusion is a known process that forms a continuous composite structure of uniform cross-section by pulling resin-coated fibers through a heated die. The die and tooling upstream from the die define the cross-section of the composite structure by orienting the fibers as they pass through the die. The fibers are dispensed by rolls of material located upstream of the die. As the fibers are pulled off their rolls, the fibers are oriented by tooling to their desired relative positions. From the tooling, the fibers pass through an emersion bath of resin, and from there the resin-coated fibers enter the die. The die is heated so that the resin cures by the time it exits from the die. Downstream from the die, hydraulic pullers clamp onto the cured composite structure as it emerges from the die and provide the force to pull the resin-coated fibers through the die. Downstream from the pullers, the composite structure travels onto a conveyor, where a moving cut-off saw cuts it into desired lengths. Advantages of pultrusion over alternative methods include high production rate and low cost.

Figure 17:
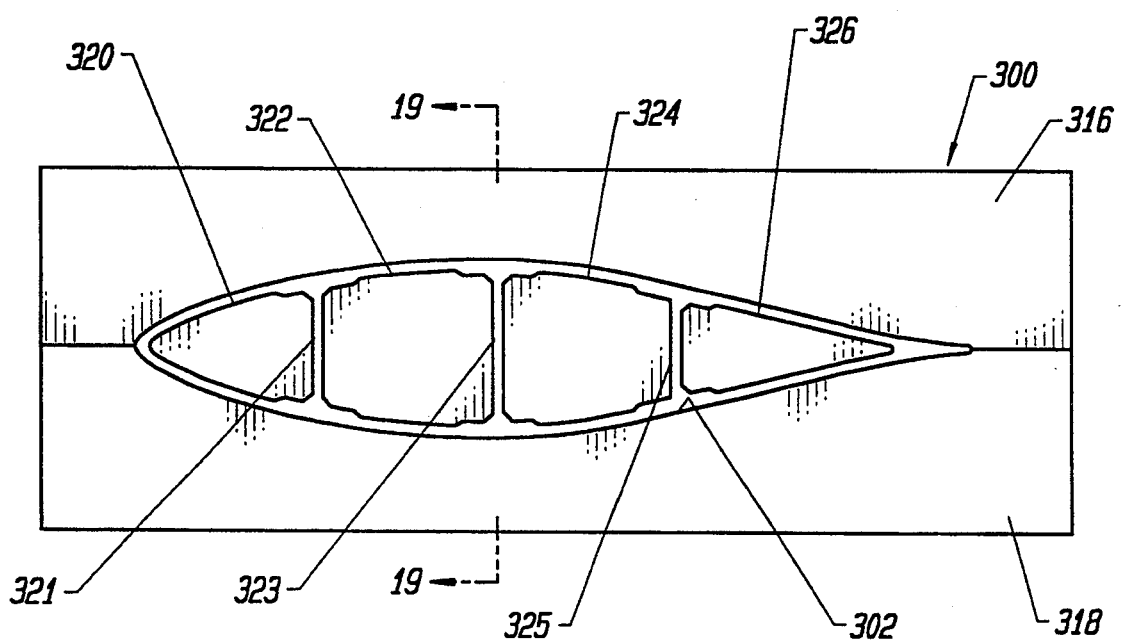
FIG. 17 is an end elevation view of a pultrusion mold utilized in fabricating blades according to the present invention.
Figure 18:
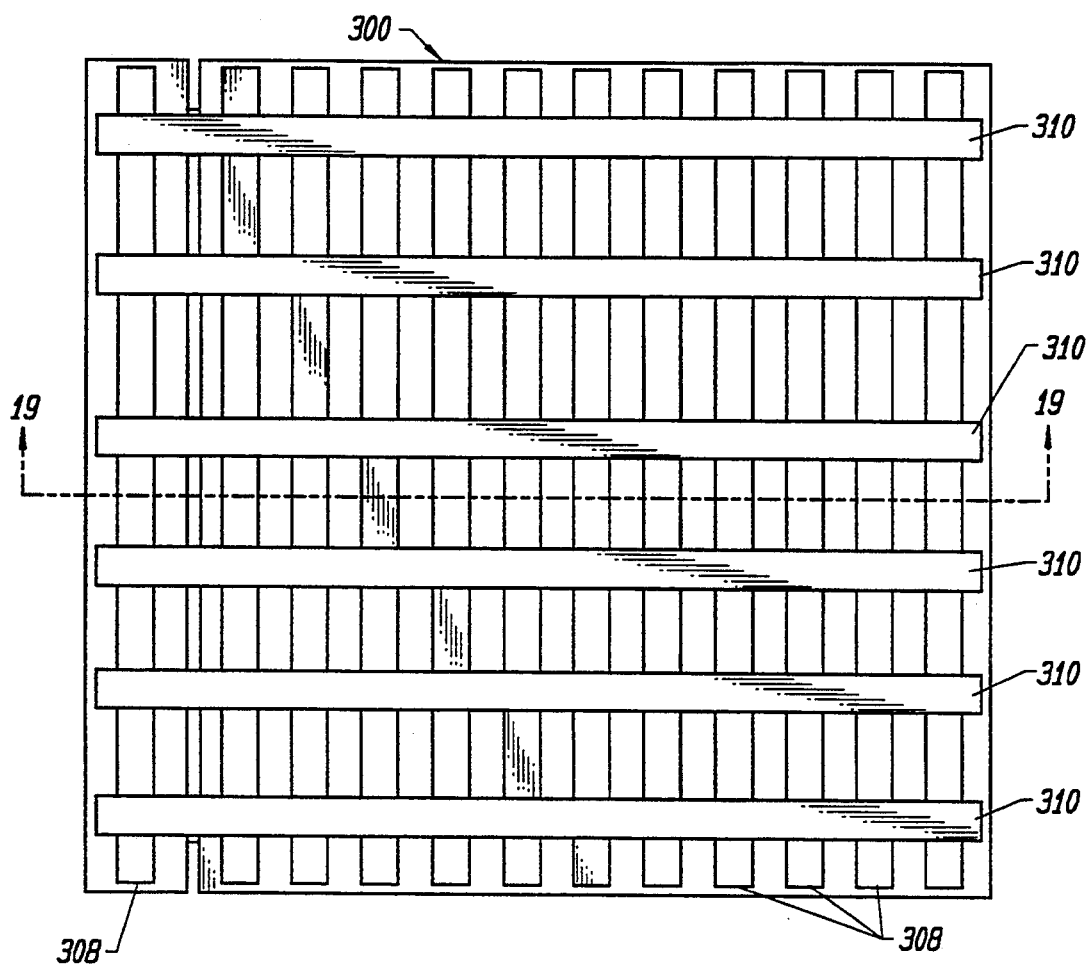
FIG. 18 is a top plan view of the pultrusion mold of FIG. 17.
Figure 19:
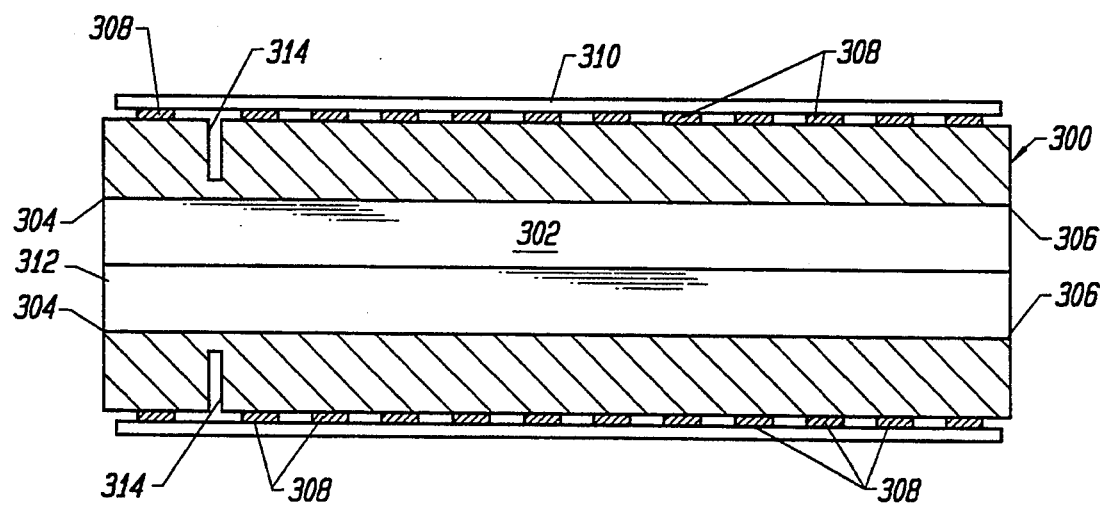
FIG. 19 s a side sectional view of the pultrusion mold of FIGS. 17 and 18, taken along section line 19—19, with mandrels removed.

In FIGS. 17-19, a pultrusion die 300 for use in fabricating blade 42 is shown. The die 300 is a two-piece, machined-steel die that is about three feet long. The die 300 has a cavity 302 of uniform cross-section that extends along a straight, horizontal axis 301 between the two ends. The interior surface of the cavity 302 defines the outer surface of the blade 42, and, thus, has the same dimensional profile as set forth in Table I, above. The cross-section of the cavity 302 is uniform throughout the die, with the exception that the edges 304 and 306 of the die are slightly radiused to prevent damages to the fibers as they are pulled through the die. Several laterally-extending strip heaters 308 are clamped to the top and bottom surfaces of the die by clamp bars 310. The entrance 312 of the die 300 is preferably kept at a cooler temperature than the rest of the die so that the resin does not cure in the entrance, which could jam the process. To that end, a isolation slot 314 is cut into the die about four inches back from the entrance to reduce thermal conduction to the entrance area. The strip heaters 308 are individually controllable so that a desirable thermal gradient can be achieved. Thermocouples (not shown) or other suitable temperature indicators are positioned within the die to provide temperature feed-back to a thermal controller (not shown). The die is preferably constructed of two halves 316 and 318, which are both machined from a single six foot blank of 4130, 4140, or 4340 steel and then cut into two three-foot sections and bolted together.

Since the blade 42 is not solid, four mandrels 320, 322, 324, and 326 are needed to define the interior surfaces of the blade. As shown in FIG. 17, the four mandrels are positioned within the cavity 302 of the die 300. The mandrels have uniform cross-sections that extend continuously through the cavity from the entrance 312 to the exit. The mandrels contain heaters and thermocouples connected to a controller so that the mandrels can be heated. The space between the mandrels and the die cavity 302 defines a skin space which forms the skin 74 of the blade 42. The spaces between adjacent mandrels define rib spaces that form the ribs of the blade 42. The space 321 between mandrels 320 and 322 forms the forward rib 75, the space 323 between mandrels 322 and 324 forms the center rib 76, and the space 325 between mandrels 324 and 326 forms the aft rib 77. The mandrels are shaped so that the composite material forms flanges 78 at the intersections of the ribs and the skin layer.

Upstream tooling (described below in connection with FIG. 20) delivers the resin-coated fabrics and fibers to the cavities defined by the die 300 and mandrels 320, 322, 324, and 326. The die and mandrels apply heat and keep the composite materials in the correct relative positions for a sufficient length of time as they slide by so that the resin cures before exiting the die. The mandrels, in effect, float within the die 300 and are laterally supported at the die by only the composite materials within the die. The surface finish of the die is preferably 8 microinches, or better, and is hard chrome plated for improved wear resistance.

Figure 20:
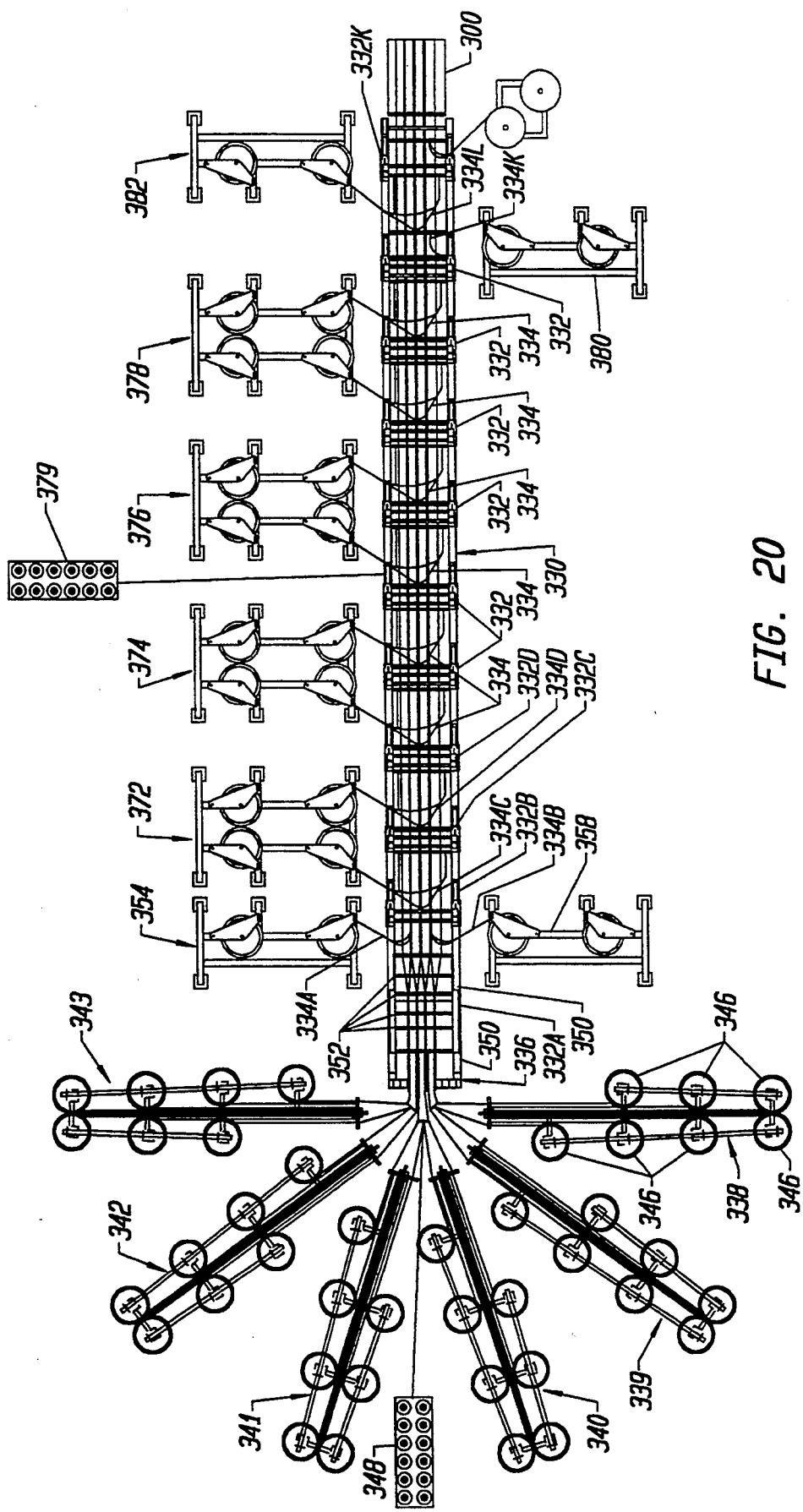
FIG. 20 is a plan view of pultrusion equipment used for feeding resin-coated fabric and fibers to the pultrusion die.
Figure 21:
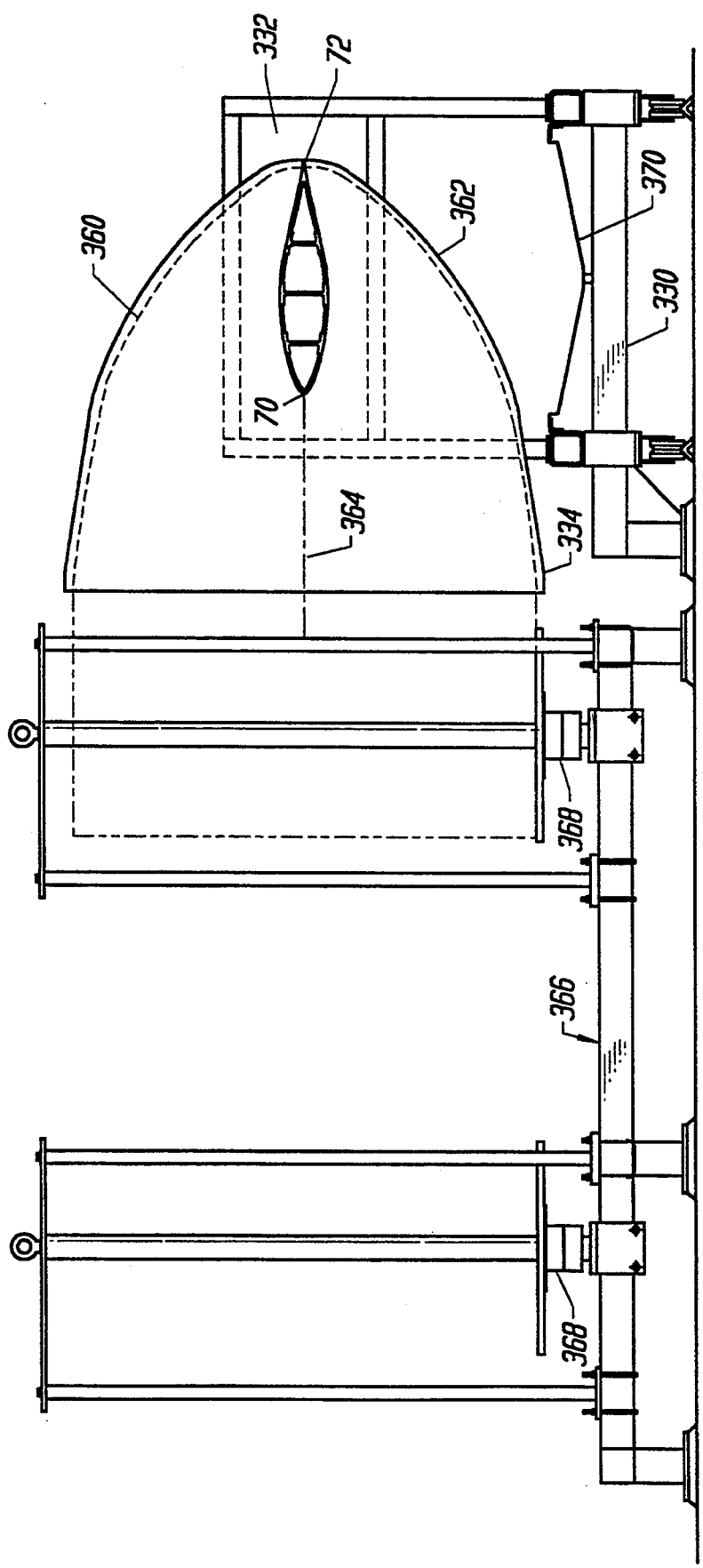
FIG. 21 is an elevation view of a feed roller rack and a folding shoe used for feeding fabric to the pultrusion die.

FIGS. 20 and 21 illustrate the tooling and equipment that supply resin-coated fabrics and fibers to the die 300. Extending about 50 feet upstream from the die 300 is a main support frame 330 to which is mounted a series of resin tanks 332 and folding shoes 334. At the far upstream end of the support frame 330 is a mandrel support 336 that anchors the upstream end of the mandrels 320, 322, 324, and 326. Between the mandrel support 336 and the die 300, the mandrels have a sheet metal skin of substantially the same outer surface configuration as the mandrels have inside the die 300.

Upstream of the mandrel support 336 are six racks 338–343, each of which carries seven rolls of fabric 346 for the seven fabric layers that comprise each half of a rib. Rack 338 supplies the fabric for layers 118–124, rack 339 supplies the fabric for layers 111–117, rack 340 supplies the fabric for layers 132–138, rack 341 supplies the fabric for layers 125–131, rack 342 supplies the fabric for layers 146–152, and rack 343 supplies the fabric for layers 139–145. A rack 348 of rolls of filler fibers supplies the fibers for areas 156–162. The rib fabric and filler fibers are oriented by guides and come together and enter the upstream end of the main support frame 330 at the mandrel support 336.

From there, the rib fabric and filler fibers pass into a first tank 332a containing resin. The tank has two end plates 350 with appropriately dimensioned slots to allow the fabric and fibers to enter and exit, while retaining most of the resin within the tank. There are several bushings 352 inside and adjacent to the first tank 332a that separate the fabric and fibers and allow the resin to fully coat all surfaces.

Once the resin-coated fabric and fibers exit tank 332a, they are oriented in substantially the desired relative positions they will have in the finished composite structure. From tank 332a, the resin-coated fabric and fibers enter tank 332b and layers 153 and 110, which will form the inside of the aft and forward voids within the blade, are introduced. Layer 153 is supplied by a rack 354 that contains double rolls 356 of the appropriately sized fabric. The fabric for layer 153 is guided by a folding shoe 334a into the desired shape. Likewise, layer 110 is introduced from a rack 358 and is guided by a folding shoe 334b into the desired shape. Layers 110 and 153, together with the rib layers, enter tank 332b where resin coats the newly-introduced layers.

Next, eight skin layers 102–109 are introduced into the ever-increasing assembly of resin-coated fabric. Each skin layer is supplied by a rack and is guided and shaped by a folding shoe 334 to envelope the resin-coated fabric emerging from an upstream tank. As shown in FIG. 21, the folding shoe 334 provides a surface that guides the fabric into the desired airfoil shape. Upper and lower edges 360 and 362 of the fabric are guided to the trailing edge 72 of the airfoil shape, while the centerline 364 of the fabric is guided to the leading edge 70. FIG. 21 also illustrates a rack 366 containing two rollers 368 onto which rolls of fabric can be mounted. Rack 366 and other double roll racks supply fabric from one roll; the other roll can be spliced onto the end of the first roll when it runs out. The main frame 330 provides support for the resin tanks 332 and drip pans 370 mounted below the tanks.

Referring back to FIG. 20 downstream of tank 332b, layers 109 and 108 are supplied from rack 372, and are positioned by folding shoes 334c and 334d, respectively. Layer 109 is coated with resin in tank 332c, while layer 108 is coated with resin in tank 332d. Layers 107, 106, 105, 104, 103, and 102, in sequence shown from left to right in FIG. 20, are incorporated into the fabric assembly. Each layer is guided and positioned by a folding shoe 334 and is coated with resin by a resin tank 332. Rack 374 carries supply rolls for layers 107 and 106, rack 376 carries supply rolls for layers 105 and 104, and rack 378 carries supply rolls for layers 103 and 102. The filler fibers 163 are introduced at the leading edge of the fabric assembly from a supply rack 379, after layer 106 is introduced and before layer 105.

After layer 102 is incorporated into the resin-coated fabric assembly, layer 154 is added to the trailing edge. Layer 154 is feed by supply rolls on rack 380, and is guided and positioned by folding shoe 334k. From the opposite side of the main frame 330, the outermost layer 101 is introduced from rack 382, and is guided and positioned by folding shoe 334l. The fabric passes through resin tank 332k. Then, layer 155 is added to the trailing edge. Layer 155 is feed by supply rolls on rack 383, and is guided and positioned by folding shoe 334m. With all of the fabric layers and filler fibers now in place, the fabric passes through the last resin tank 332l and enters the heated die 300.

Pultrusion pullers (not shown) of conventional construction, with clamps configured to grasp the outer surface of the blade, are located downstream of the die 300, and operate to pull the cured composite structure through the die. The pullers may be actuated by a ball screw or hydraulic cylinder or other device. Alternatively, the pullers may be a track-mounted device similar to a caterpillar tread, which recirculates and pulls the pultrusion through the die. As it exits the die, the composite structure is fed to a roller conveyor (not shown) and is cut to the desired length by a cut-off saw (not shown).

The blade and its method of manufacturing described above provide many advantages over conventional aluminum blades for Darrieus-type vertical-axis wind turbines. (1) The pultruded blade of the present invention costs about one-half the cost of a conventional blade. (2) No surface finishing of the pultruded blade is required after it emerges from the pultrusion die. (3) The pultruded blade is lighter and has a lower modulus, so it more readily conforms to a troposkein shape and, thus, creates lower stresses both within the blade and in the tower and support structures. (4) VAWTs of increased height-to-diameter ratios (H/D) can be economically built. The increased H/D allows a VAWT to generate more power because its swept area is increased by going upward. Not only is the swept area increased, but the wind at the higher elevation will most likely have more energy because the ground shear effect slows down the wind closer to the ground. An increased H/D yields more power out of a given land mass by several VAWTs in a wind farm because the swept area o the turbines is increased not by increasing diameter, but by going upward, which will not decrease the effective spacing between VAWTs. Thus, the present invention provides an attractive way to increase energy and reduce costs in a blade retrofit program.

From the above description, it will be apparent that the invention disclosed herein provides a novel and advantageous blade, and method of manufacture, for a Darrieus-type vertical-axis wind turbine. The foregoing discussion discloses and describes merely exemplary methods and embodiments of the present invention. As will be understood by those familiar with the art, the invention may be embodied in other specific forms without departing from the spirit or essential characteristics thereof.

Alternative blade construction techniques may fall within the scope of the present invention, even if not set forth in detail herein. For example, the blade could be made in two or more lengthwise segments such as a leading edge section and a trailing edge section, and possibly one or more center sections. Such a construction could permit the use of larger chord blades (overcoming limitations in pultrusion size), or to use different materials in different sections of the blade. This construction would allow access to the interior of the blade, which might be useful to change the center of mass of the blade or to install ducting for airflow control devices or de-icing plumbing. A center section could be fabricated as a box or I-beam, with leading edge and trailing edge pultrusions bonded thereto as fairings.

Alternatively, the blade could be pultruded in two or more lengthwise pieces, split longitudinally along the chord line, each piece without any internal cavities. This would simplify the construction of the pultrusion mold by eliminating the need for floating mandrels. The lengthwise pieces could then be bonded together to form a unitary blade. Such a unitary blade might be curved prior to bonding, which would lessen the stresses caused by bending the blade upon installation.

Another alternative multi-piece blade would add a separate lengthwise stiffening member to be bonded to the blade after it is bent to a curved shape for installation. Such a multi-piece blade would have improved resistance to buckling loads, without unduly increasing loads due to bending the blade into place.

Still another alternative blade construction could have a lengthwise spar of box cross-section instead of internal ribs. The spar could be fabricated, prior to the blade pultrusion, from composite materials, such as a transverse filament tape, wound around a mandrel. Such a pre-fabricated spar could be fed into the pultrusion mold at the same time as resin-coated fabrics that would form the skin layers. The skin layers of such a blade construction could be thinner than those of a unitary ribbed design.

Another blade construction technique would be to use transverse filament tape to fabricate the entire blade, instead of using a pultrusion process. Blades build according to this technique could be fabricated with a slight bend and bent further to a troposkein shape upon installation.

As for blade materials, fibers other than glass may be used, such as Kevlar, graphite or carbon fibers. The pultrusion could incorporate pre-cured components, such as carbon, glass or Kevlar fabric, or foam cores or metal reinforcements.

As for the blade design, while it is preferred to fabricate a flat, straight blade and bend it into place, alternatively, the blade could be prebent during manufacture, flattened for transportation, then further bent upon installation onto a turbine. The slight pre-bend would decrease the bending stress caused by bending the blades at installation, while maintaining the ability to flatten the blade during transportation. The pultrusion process could be adapted to fabricating a curved blade by using a mold with a curved axis, and pullers that maintain the curve.

Another alternative blade design would modify the point of attachment of the bend-into-place blade to the rest of the turbine. The blade could be joined to the turbine, not at the root attachment points, but at the strut attachment points. The blade structure from the strut attachment to the root attachment would be a different structure than the bend-into-place blade that spans the two strut attachments. In other words, such a blade would have joints in the blade at the location of the struts.

Accordingly, the disclosure of the present invention is intended to be illustrative, but not limiting, of the scope of the invention, which is set forth in the following claims.

What is claimed is:

1. A method for constructing a Darrieus-type vertical axis wind turbine comprising the steps of:
   fabricating a plurality of blades by a pultrusion process;
   erecting a rotatable, vertical tower having blade root attachment points near the top and bottom thereof;
   installing one end of each blade to the blade root attachment point near the top of the tower, elastically bending the blade to a curved shape, and installing the other end of the blade to the blade root attachment point near the bottom of the tower.

2. A method as recited in claim 1 wherein the step of fabricating a plurality of blades is performed on the site of the wind turbine.

3. A method as recited in claim 1 wherein the step of fabricating a plurality of blades is performed off the site of the wind turbine, and further including a step of transporting the blades to the site of the wind turbine.

4. A method as recited in claim 1 wherein the step of elastically bending the blade to a curved shape occurs on the ground and prior to the installation of the blade onto the tower.

5. A method for fabricating blades for a Darrieus-type vertical axis wind turbine comprising the steps of:
providing a pultrusion mold having a cavity of uniform cross-section and extending between two open ends thereof, wherein an interior surface of the pultrusion mold defines an airfoil shaped surface;
providing two or more mandrels within the cavity of the pultrusion mold, wherein the mandrels have outer surfaces that define a rib cavity between the mandrels and define a skin cavity between the mandrels and the interior surface of the pultrusion mold;
providing several adjacent layers of glass cloth coated with resin to the skin cavity within the pultrusion mold;
providing several adjacent layers of glass cloth coated with resin to the rib cavity within the pultrusion mold;
pulling the layers of glass cloth coated with resin straight through the pultrusion mold while heating the pultrusion mold to substantially cure the resin before it exits the mold to form a straight, continuous blade pultrusion;
cutting the blade pultrusion into blades of equal length;
forming an attachment means at each end of each blade; and
elastically bending the blade into a curved shape upon installation onto a Darrieus-type vertical axis wind turbine.

6. A method for fabricating blades for a Darrieus-type vertical axis wind turbine comprising the steps of:
providing a pultrusion mold having a cavity of uniform cross-section and extending between two open ends thereof and having a lengthwise mold axis extending therethrough, wherein an interior surface of the pultrusion mold defines an airfoil shaped surface;
providing fibers coated with resin to the pultrusion mold;
pulling the fibers coated with resin through the pultrusion mold while heating the pultrusion mold to substantially cure the resin before it exits the mold to form a continuous blade pultrusion;
cutting the blade pultrusion into blades of equal length;
forming an attachment means at each end of each blade; and
elastically bending the blade into a curved shape upon installation onto a Darrieus-type vertical axis wind turbine.

7. A method as recited in claim 6 wherein the step of providing fibers coated with resin to the pultrusion mold includes providing multiple plys of non-woven, unidirectional fibers having fiber orientations of 0°, +45°, and −45° with respect to the mold axis.

8. A method as recited in claim 7 wherein certain fibers provided to the pultrusion mold are skin fibers that form a skin of the blade pultrusion, and wherein about two-thirds of the skin fibers are oriented at 0° with respect to the mold axis, about one-sixth of the skin fibers are oriented at +45° with respect to the mold axis, and the remaining about one-sixth of the skin fibers are oriented at −45° with respect to the mold axis.

9. A method as recited in claim 8 wherein the skin fibers are supplied to the pultrusion mold in the form of glass cloth that includes several plys of 0°/+45°/0° fabric and an equal number of plys of 0°/−45°/0° fabric, wherein a 0°/+45°/0° ply of fabric has two layers of fibers oriented at 0° with respect to the mold axis joined to an intermediate layer of fibers oriented at +45° with respect to the mold axis, and wherein a 0°/−45°/0° ply of fabric has two layers of fibers oriented at 0° with respect to the mold axis joined to an intermediate layer of fibers oriented at with respect to the mold axis.

10. A method as recited in claim 7 wherein certain fibers provided to the pultrusion mold are rib fibers that form one or more internal ribs of the blade pultrusion, and wherein about one-half of the rib fibers are oriented at 0° with respect to the mold axis, about one-fourth of the rib fibers are oriented at +45° with respect to the mold axis, and the remaining about one-fourth of the rib fibers are oriented at −45° with respect to the mold axis.

11. A method as recited in claim 10 wherein the rib fibers are supplied to the pultrusion mold in the form of glass cloth that includes several plys of 0°/+45° fabric and an equal number of plys of 0°/−45° fabric, wherein a 0°/+45° ply of fabric has a layer of fibers oriented at 0° with respect to the mold axis and joined to an adjacent layer of fibers oriented at +45° with respect to the mold axis, and wherein a 0°/−45° ply of fabric has a layer of fibers oriented at 0° with respect to the mold axis and joined to an adjacent layer of fibers oriented at −45° with respect to the mold axis.

12. A method as recited in claim 6 wherein the pultrusion steps are performed on the site of the wind turbine upon which the blades are to be installed.

13. A method as recited in claim 6 wherein the pultrusion steps are performed off the site of the wind turbine upon which the blades are to be installed, and the blades are thereafter transported to the site and installed on the wind turbine.

* * * * *